(12) United States Patent
Kim et al.

(10) Patent No.: US 11,982,785 B1
(45) Date of Patent: May 14, 2024

(54) APPARATUS FOR OBSERVING PRECIPITATION AND METHOD FOR CONTROLLING THE SAME

(71) Applicant: NATIONAL INSTITUTE OF METEOROLOGICAL SCIENCES, Seogwipo-si (KR)

(72) Inventors: Yoo Jun Kim, Gangneung-si (KR); Bo Yeong Ahn, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/405,220

(22) Filed: Jan. 5, 2024

(30) Foreign Application Priority Data

Jan. 5, 2023 (KR) .................. 10-2023-0001656

(51) Int. Cl.
*G01W 1/02* (2006.01)
*G01W 1/14* (2006.01)

(52) U.S. Cl.
CPC ............... *G01W 1/02* (2013.01); *G01W 1/14* (2013.01)

(58) Field of Classification Search
CPC .......... G01W 1/14; G01W 1/00; G01W 1/08; G01W 1/16; G01W 1/10; G01W 1/02; G01W 1/04; G01W 1/06; G01W 2001/003; G01W 1/12; G01W 1/17; G01W 1/18; G01W 2001/006; G01W 2203/00; G01W 2201/00

USPC ........................................ 73/170.16–170.28
See application file for complete search history.

(56) References Cited

U.S. PATENT DOCUMENTS

| | | | | |
|---|---|---|---|---|
| 3,432,656 | A | * | 3/1969 | Smith ................... G01N 23/12 250/363.01 |
| 7,540,186 | B2 | * | 6/2009 | Jeong .................... G01W 1/14 73/170.21 |
| 2007/0132599 | A1 | * | 6/2007 | DuFaux ................. G01W 1/14 702/3 |

FOREIGN PATENT DOCUMENTS

| | | | | | |
|---|---|---|---|---|---|
| CN | 110691988 | A | * | 1/2020 | ............. G01S 13/95 |
| KR | 10-1230558 | B1 | | 2/2013 | |
| KR | 10-2015-0080840 | A | | 7/2015 | |
| KR | 10-2023876 | B1 | | 9/2019 | |
| KR | 10-2021-0066283 | A | | 6/2021 | |
| KR | 10-2021-0089090 | A | | 7/2021 | |
| KR | 102310512 | B1 | * | 10/2021 | |
| KR | 10-2465078 | B1 | | 11/2022 | |
| SE | 514571 | C2 | * | 3/2001 | ............. G01W 1/14 |

* cited by examiner

*Primary Examiner* — Andre J Allen
(74) *Attorney, Agent, or Firm* — Bridgeway IP Law Group, PLLC; Jihun Kim

(57) ABSTRACT

Described is a precipitation observation apparatus including a bottom plate on which a precipitation gauge and a snowfall observation apparatus are provided; a determining unit which determines a state of a precipitation; a control unit which controls at least one of the precipitation gauge and the snowfall observation apparatus to measure the precipitation based on state information of the precipitation; and a calculating unit which calculates at least one of a rainfall amount, a snowfall amount, and a precipitation amount based on measurement information of the precipitation.

10 Claims, 12 Drawing Sheets

APPARATUS FOR OBSERVING PRECIPITATION AND METHOD FOR CONTROLLING THE SAME

CROSS-REFERENCE TO RELATED APPLICATIONS

This application claims the priority of Korean Patent Application No. 10-2023-0001656 filed on Jan. 5, 2023, in the Korean Intellectual Property Office, the disclosure of which is incorporated herein by reference.

BACKGROUND

Field

The present disclosure relates to an apparatus for observing precipitation and a method for controlling the same.

DESCRIPTION OF THE RELATED ART

Precipitation is an important element used for various fields, such as meteorological phenomenon monitoring, model analysis, and prediction in fields of meteorology, hydrology, and environment. Further, when heavy snowfall occurs in winter, disaster phenomena, such as traffic delays, suspension of aircraft operations, or destruction of facilities frequently occur due to icy roads so that it is important to quantitatively observe snowfall phenomena. However, it is not simple to accurately observe the precipitation and furthermore, when the form of precipitation is solid, such as snow, the observation error may be as large as 20 to 50%. Specifically, the snowfall phenomena are greatly affected by wind and an amount of snowfall is observed differently depending on a temperature, a humidity, particle shapes according to time and space, sizes, and density change so that it is difficult to accurately observe the snowfall phenomena.

Further, accurate measurement of precipitation is necessary to prepare disasters and calamities and obtain economic effects in the event of flood damage. However, measurement devices such as automatic drain type weighting precipitation gauges which are currently regularly operated in meteorological stations may not respond quickly to the situation problem of sudden snowfall occurring when a pure rainfall amount is measured. Accordingly, a quality of precipitation observation data is degraded due to a problem in that errors are included in precipitation observation data, or an observation error problem caused by fallen leaves or pine needles accumulated in the drain.

A related art of the present disclosure is disclosed in Korean Registered Patent Publication No. 10-1230558.

SUMMARY

In order to solve the problems of the related art, an object of the present disclosure is to provide an apparatus for observing precipitation which solves a problem in that it is difficult to accurately observe snowfall, which is observed differently depending on wind, temperature, humidity, particle shapes according to time and space, sizes, and density change and a method for controlling the same.

In order to solve the problems of the related art, an object of the present disclosure is to provide an apparatus for observing precipitation which solves a problem in that errors are included in the precipitation measurement data because a precipitation gauge does not respond quickly to the situation problem of sudden snowfall occurring when a pure rainfall amount is measured and a method for controlling the same.

However, objects to be achieved by various embodiments of the present disclosure are not limited to the technical objects as described above and other technical objects may be present.

As a technical means to achieve the above-described technical object, according to an aspect of the present disclosure, a precipitation observation apparatus may include a bottom plate on which a precipitation gauge and a snowfall observation apparatus are provided; a determining unit which determines a state of a precipitation; a control unit which controls at least one of the precipitation gauge and the snowfall observation apparatus to measure the precipitation based on state information of the precipitation; and a calculating unit which calculates at least one of a rainfall amount, a snowfall amount, and a precipitation amount based on measurement information of the precipitation.

According to an exemplary embodiment of the present disclosure, the determining unit may determine whether the state of precipitation is snow or rain.

According to an exemplary embodiment of the present disclosure, when the state of precipitation is snow, the determining unit may determine the state of snow as any one of dry snow and wet snow.

According to an exemplary embodiment of the present disclosure, the calculating unit may calculate at least one of a snow density and a water equivalent ratio based on the precipitation amount and the snowfall amount.

According to an exemplary embodiment of the present disclosure, the determining unit may determine the state of snow as any one of dry snow and wet snow based on the snow density and the water equivalent ratio.

According to an exemplary embodiment of the present disclosure, the calculating unit may calculate expected snowfall amount information based on the water equivalent ratio.

According to an exemplary embodiment of the present disclosure, the calculating unit calculates error information based on the expected snowfall amount information and the snowfall amount and may apply the error information to calculate the expected snowfall amount information.

According to an exemplary embodiment of the present disclosure, when a wet-bulb temperature is equal to or higher than a predetermined threshold wet-bulb temperature, the control unit measures the precipitation using the precipitation gauge and when the wet-bulb temperature is lower than the predetermined threshold wet-bulb temperature, the control unit measures the precipitation using the snowfall amount measuring apparatus.

According to an exemplary embodiment of the present disclosure, the plurality of precipitation gauges each includes a lid and a drain which are open/closed by control, the lid is provided on a top of the precipitation gauge, the drain is provided on a bottom of the precipitation gauge, and the control unit opens the lid during a predetermined precipitation observation time and may close the lid when the precipitation observation time has elapsed.

According to an exemplary embodiment of the present disclosure, when a water level of the first precipitation gauge exceeds a predetermined threshold water level before ending the precipitation observation time, the control unit controls the lid of the first precipitation gauge to be closed and the lid of the second precipitation gauge to be open, and when the lid of the precipitation gauge is closed or the observation ends, opens the drain after sensing the precipitation in the precipitation gauge to drain the precipitation.

According to an exemplary embodiment of the present disclosure, the precipitation observation apparatus includes a plurality of fences which extends from the bottom plate, an angle with the bottom plate being changed by control, and the control unit may control the fence to form a predetermined angle between the bottom plate and the fence during snowfall measurement time.

According to an exemplary embodiment of the present disclosure, when a foreign material is sensed in the precipitation gauge whose lid is open, the control unit controls an air-blow provided in the precipitation gauge to discharge the foreign material to the outside.

According to an exemplary embodiment of the present disclosure, when a temperature in the precipitation gauge is lower than a predetermined threshold temperature, the control unit controls a heater provided in the precipitation gauge to raise the temperature in the precipitation gauge to be equal to or higher than the threshold temperature.

According to an aspect of the present disclosure, a control method of a precipitation observation apparatus including a bottom plate on which a precipitation gauge and a snowfall observation apparatus are provided may include: determining a state of a precipitation; controlling at least one of the precipitation gauge and the snowfall observation apparatus to measure the precipitation based on state information of the precipitation; and calculating at least one of a rainfall amount, a snowfall amount, and a precipitation amount based on measurement information of the precipitation.

The above-described solving means are merely illustrative but should not be construed as limiting the present disclosure. In addition to the above-described embodiments, additional embodiments may be further provided in the drawings and the detailed description of the present disclosure.

According to the above-described object of the present disclosure, a precipitation observation apparatus and a control method thereof are provided to solve a problem in that it is difficult to accurately measure a snowfall amount which is differently observed depending on wind, a temperature, a humidity, a particle shape according to time and space, a size, and a density change.

According to the above-described object of the present disclosure, a precipitation observation apparatus and a control method thereof are provided to solve the problem in that it is difficult to quickly respond to a situation problem of sudden snowfall occurrence during the measurement of a pure rainfall amount of the precipitation gauge so that an error is included in the precipitation observation data.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
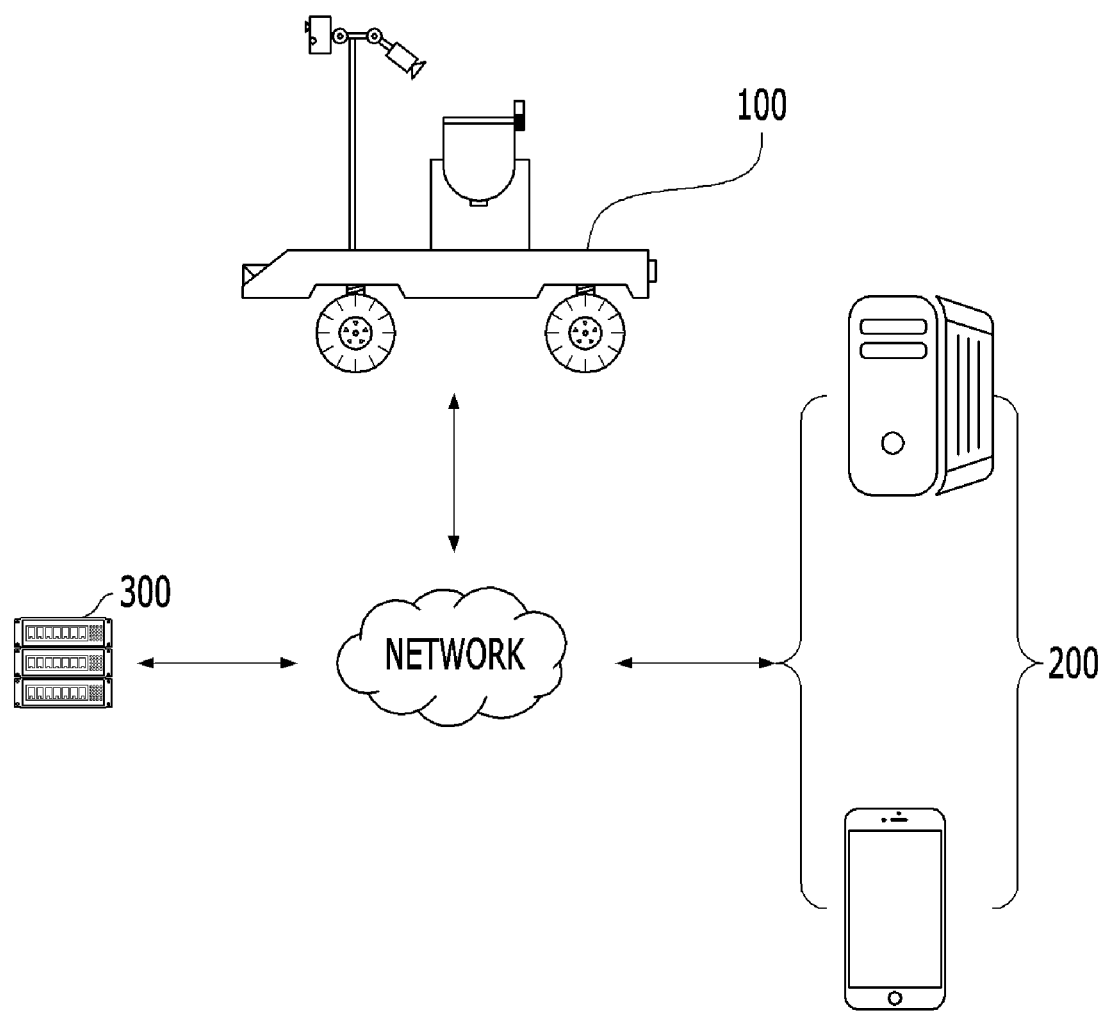
FIG. 1 is a schematic diagram of a precipitation observation system according to an exemplary embodiment of the present disclosure.

Hereinafter, the present disclosure will be described more fully hereinafter with reference to the accompanying drawings, in which exemplary embodiments of the present disclosure are shown. However, the present disclosure may be realized in various different forms and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member, or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

FIG. 1 is a schematic diagram of a precipitation observation system according to an exemplary embodiment of the present disclosure.

Referring to FIG. 1, a precipitation observation system 1 (hereinafter, also referred to as this system 1) includes a precipitation observation apparatus 100 (hereinafter, also referred to as this apparatus 100), a user terminal 200, and an external server 300, but is not limited thereto.

This apparatus 100 controls at least one of a precipitation gauge 111 and a snowfall observation apparatus to determine a state of precipitation and measure precipitation based on the precipitation state and may calculate at least one of a rainfall amount, a snowfall amount, and a precipitation amount based on the measured precipitation.

Further, this apparatus 100 moves to an observation site, determines a precipitation observation time based on seasonal information, and measures a precipitation amount based on the determined precipitation observation time when the precipitation is sensed, and may transmit the measured precipitation amount to at least one of the user terminal 200 and the external server 300 via a network. The precipitation amount may include at least one of the rainfall amount and the snowfall amount.

The user terminal 200 may control this apparatus 100 through a network. A plurality of user terminals 200 may be provided.

The external server 300 may store precipitation occurrence information, rainfall information, snowfall information, and precipitation information and may transmit/receive information which is being stored to at least one of this apparatus 100 and the user terminal 200. Further, the external server 300 may store precipitation information, seasonal information, information used to determine seasonal information and may transmit/receive information which is being stored to at least one of this apparatus 100 and the user terminal 200. The precipitation information may include at least one of rainfall information and snowfall information.

According to an exemplary embodiment of the present disclosure, this apparatus 100 may provide a rainfall measurement menu, a snowfall measurement menu, and a precipitation measurement menu to the user terminal 200. For example, the user terminal 200 downloads and installs an application program provided by this apparatus 100 and the rainfall measurement menu, the snowfall measurement menu, and the precipitation measurement menu may be provided through the installed application.

This apparatus 100 may include all kinds of servers, terminals, or devices having functions of transmitting and receiving data, contents, and various communication signals with the user terminal 200 and the external server 300 via a network and storing and processing data.

The user terminal 200 is a device which interworks with this apparatus 100 and the external server 300 via the network, and for example, may be all kinds of wireless communication devices such as a smart phone, a smart pad, a tablet PC, a wearable device, a personal communication system (PCS), a global system for mobile communication (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), a wireless broadband internet (Wibro) terminal and fixed terminals such as a desktop computer and a smart TV.

An example of the network for sharing information between this apparatus 100, the user terminal 200, and the external server 300 may include a 3rd generation partnership project (3GPP) network, a long term evolution (LTE) network, a 5G network, a world interoperability for microwave access (WIMAX) network, wired/wireless Internet, a local area network (LAN), a wireless local area network (wireless LAN), a wide area network (WAN), a personal area network (PAN), a Bluetooth network, a WiFi network, a near field communication (NFC) network, a satellite broadcasting network, an analog broadcasting network, and a digital multimedia broadcasting (DMB) network, but are not limited thereto.

Figure 2:
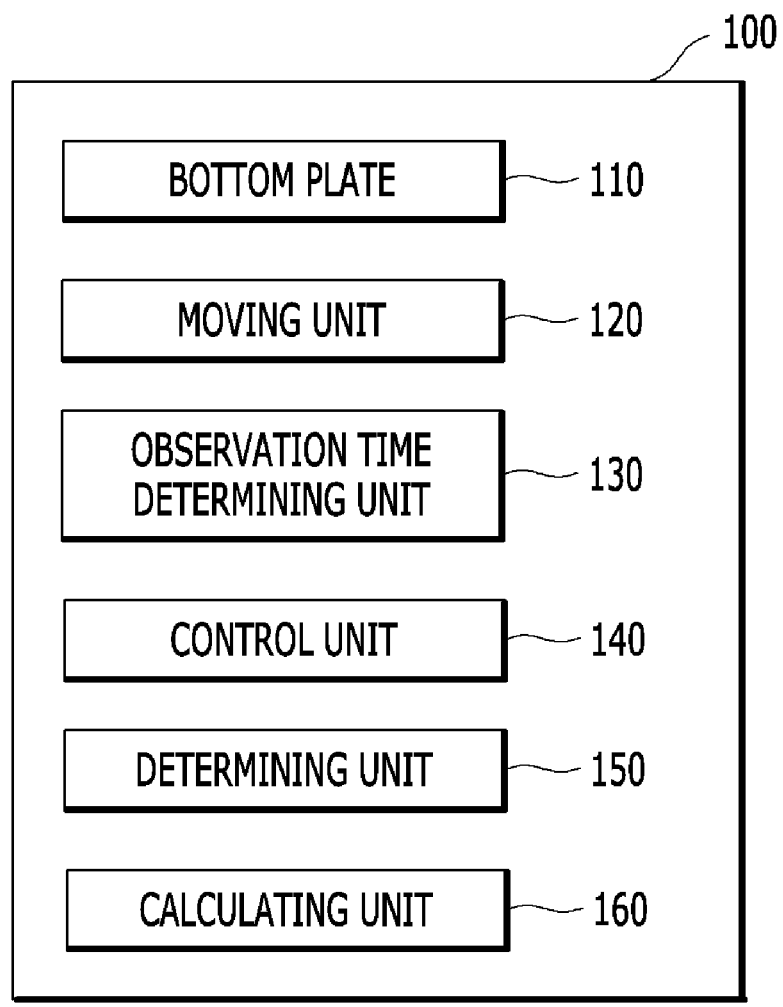
FIG. 2 is a schematic block diagram of a precipitation observation apparatus according to an exemplary embodiment of the present disclosure.

FIG. 2 is a schematic block diagram of a precipitation observation apparatus 100 according to an exemplary embodiment of the present disclosure.

Referring to FIG. 2, this apparatus 100 may include a bottom plate 110, a moving unit 120, an observation time determining unit 130, a control unit 140, a determining unit 150, and a calculating unit 160.

Figure 3:
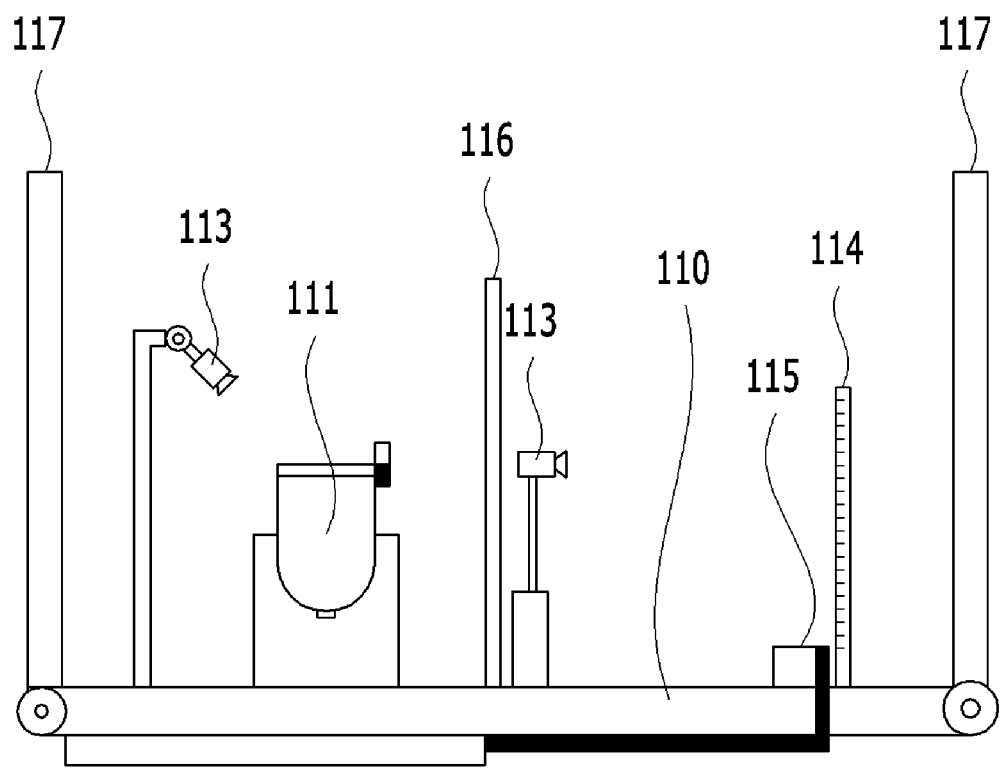
FIG. 3 is a left side view of a precipitation observation apparatus according to an exemplary embodiment of the present disclosure.

FIG. 3 is a left side view of a precipitation observation apparatus 100 according to an exemplary embodiment of the present disclosure.

Referring to FIG. 3, this apparatus 100 includes at least one of a bottom plate 110, a precipitation gauge 111, a camera sensor 113, a ruler 114 for measuring a snowfall, a snowfall removal member 115 which removes the measured snowfall from the bottom plate 110, a barrier 116 which prevents the influence between the rainfall measurement and the snowfall measurement, and a fence 117 which reduces the influence of the wind when the rainfall or snowfall is measured, but is not limited thereto. This apparatus 100 may include a plurality of sensors. Even though it is not illustrated in FIG. 3, this apparatus 100 may include a movement member 112.

The camera sensor 113 may include a camera sensor 113 for capturing the precipitation gauge 111, a camera sensor 113 for driving, a camera sensor 113 for monitoring a present weather condition, and a camera sensor 113 for capturing the ruler 114 which measures the snowfall (also referred to as a camera sensor 113 for observing snowfall) and at least one of them may be provided in this apparatus 100.

The plurality of sensors includes a temperature sensor, a humidity sensor, a wet-bulb temperature sensor, an air pressure sensor, a pressure sensor, a wind volume sensor, a wind direction sensor, and a wind speed sensor, but is not limited thereto.

The bottom plate 110, the barrier 116, and the fence 117 may include hot wires which radiate predetermined heat by control.

As an example, the control unit 140 controls a hot wire in at least one of the bottom plate 110, the barrier 116, and the fence 117 to allow the hot wire in at least one of the bottom plate 110, the barrier 116, and the fence 117 to radiate predetermined heat during a predetermined time. The hot wire applies heat snow which is in contact with at least one of the bottom plate 110, the barrier 116, and the fence 117 so that the snow which is in contact with at least one of the bottom plate 110, the barrier 116, and the fence 117 melts. Therefore, the snowfall on the bottom plate 110 is easily removed.

According to the exemplary embodiment of the present disclosure, the bottom plate 110 may include a precipitation gauge 111 and a snowfall observation apparatus.

For example, the bottom plate 110 includes at least one precipitation gauge 111 and at least one snowfall observation apparatus thereon and includes a barrier 116 between the precipitation gauge 111 and the snowfall observation apparatus and includes a drain which drains precipitation discharged from the precipitation gauge 111 and snowfall pushed out from a predetermined area of the snowfall observation apparatus.

According to the exemplary embodiment of the present disclosure, the determining unit 150 may determine a state of the precipitation.

For example, when the precipitation is sensed based on at least one of image information, sensing information, and information received from the external server 300, the determining unit 150 may determine the state of the precipitation based on at least one of the image information, the sensing information, and the information received from the external server 300.

According to the exemplary embodiment of the present disclosure, the control unit 140 may control at least one of the precipitation gauge 111 and the snowfall observation apparatus to measure precipitation based on the state information of the precipitation.

For example, when the state of the precipitation is determined as rain, the control unit 140 may control the precipitation gauge 111 to measure the precipitation. In contrast, when the state of the precipitation is determined as snow, the control unit 140 may control the snowfall observation apparatus to measure the precipitation (snowfall). The snowfall observation apparatus may include a camera sensor 113 for observing snowfall, a ruler 114 for observing-> measuring the snowfall, and a snowfall removal member 115. When the snowfall observation apparatus is controlled, it may mean that at least one of the camera sensor 113 for observing snowfall and the snowfall removal member 115 is controlled.

As another example, when this apparatus 100 senses the rainfall during the snowfall observation, the control unit 140 stops measuring the precipitation using the snowfall observation apparatus and may start measuring the precipitation using the precipitation gauge 111. Further, when this apparatus 100 senses the snowfall during the rainfall observation, the control unit 140 stops measuring the precipitation using the precipitation gauge 111 and may start measuring the precipitation using the snowfall observing apparatus.

According to the exemplary embodiment of the present disclosure, the calculating unit 160 may calculate at least one of a rainfall amount, a snowfall amount, and a precipitation amount based on the measurement information of the precipitation.

For example, the calculating unit 160 calculates a state of the precipitation and at least one of a rainfall amount, a snowfall amount, and a precipitation amount in a predetermined time zone based on the measurement information of the precipitation, provides at least one of the rainfall amount, the snowfall amount, and the precipitation amount to an interface provided in the user terminal 200, and may provide a timing of occurrence of precipitation, a duration of the precipitation, and an interval for every type of precipitation.

According to the exemplary embodiment of the present disclosure, the determining unit 150 may determine whether the state of the precipitation is snow or rain.

For example, the determining unit 150 may determine whether the state of the precipitation is snow (snowfall) or rain (rainfall) based on at least one of the image information, the sensing information, and the information received from the external server 300.

As another example, when the precipitation is sensed, the determining unit 150 inputs image information and sensing information to an artificial neural network which learns image information about snow, sensing information about snow, image information about rain, and sensing information about rain as learning data to output the state of the precipitation and may determine whether it is snow or rain based on the output state of precipitation.

For example, the artificial intelligence-based learning model may be generated by artificial intelligence based learning such as machine learning or deep learning, but is not limited thereto and may be applied to various neural network systems which have been already developed or will be developed in the future.

According to the exemplary embodiment of the present disclosure, when the state of the precipitation is snow, the determining unit 150 may determine the state of snow as one of dry snow and wet snow.

For example, when the sensed state of the precipitation is snow, the determining unit 150 may determine whether the state of snow is dry snow or wet snow based on at least one of the image information, the sensing information, and the information received from the external server 300.

As another example, when the sensed state of the precipitation is snow, the determining unit 150 inputs image information of snow and sensing information of snow to an artificial neural network which learns image information of dry snow, sensing information of the dry snow, image information of wet snow, and sensing information of the wet snow as learning data to output information about the state of snow and may determine the sensed state of snow as any one of dry snow and wet snow based on the output information about the state of snow.

For example, the artificial intelligence-based learning model may be generated by artificial intelligence based learning such as machine learning or deep learning, but is not limited thereto and may be applied to various neural network systems which have been already developed or will be developed in the future.

As another example, when this apparatus 100 senses the precipitation and a location altitude of this apparatus 100 is less than a predetermined height above sea level, the determining unit 150 may determine the state of the precipitation as any one of dry snow, wet snow, and rain based on predetermined reference standard deviation information of a thickness value corresponding to location information of this apparatus 100.

As another example, the determining unit 150 substitutes the state of precipitation, temperature information, and relative humidity information into a predetermined determination graph to determine the state of the precipitation as any one of dry snow, wet snow, and rain and may display a coordinate of the state of precipitation to be determined which is located on the determination graph and the determined state information of precipitation on an interface provided to the user terminal 200.

According to the exemplary embodiment of the present disclosure, the calculating unit 160 may calculate at least one of a snow density and a water equivalent ratio based on the precipitation amount and the snowfall amount.

For example, the calculating unit 160 computes a precipitation amount in a predetermined time zone and a snowfall amount in a predetermined time zone with a predetermined equation to calculate at least one of a snow density of the predetermined time zone and a water equivalent ratio of the predetermined time zone.

As another example, the calculating unit 160 provides the precipitation amount and the snowfall to the interface provided to the user terminal 200 as primary outputs and provides the snow density and the water equivalent ratio as secondary outputs corresponding to the primary outputs and may provide causality information between the primary output and the secondary output.

According to the exemplary embodiment of the present disclosure, the determining unit 150 may determine the state of snow as any one of dry snow and wet snow based on the snow density and the water equivalent ratio.

For example, when the snow density in the predetermined time zone is equal to or higher than a predetermined threshold snow density, the determining unit 150 determines the state of snow corresponding to the snow density in the predetermined time zone as wet snow. Further, when the water equivalent ratio in the predetermined time zone is equal to or higher than a predetermined threshold water equivalent ratio, the determining unit 150 may determine the state of snow corresponding to the water equivalent ratio in the predetermined time zone as dry snow which is heavy snow having a predetermined snowfall amount per unit time or more.

According to the exemplary embodiment of the present disclosure, the calculating unit 160 may calculate expected snowfall amount information based on the water equivalent ratio.

For example, the calculating unit 160 calculates an expected precipitation amount by inputting a ground temperature and a temperature at a specific barometric altitude in a region within a predetermined radius from the location information of this apparatus 100 to an artificial neural network which learns a temperature at the specific barometric altitude, the ground temperature, and actual precipitation amount as learning data and may calculate the predicted snowfall information by calculating the calculated expected precipitation amount and the calculated water equivalent ratio with a predetermined equation.

For example, the artificial intelligence-based learning model may be generated by artificial intelligence based learning such as machine learning or deep learning, but is not limited thereto and may be applied to various neural network systems which have been already developed or will be developed in the future.

According to the exemplary embodiment of the present disclosure, the calculating unit 160 may calculate error information based on the expected snowfall amount information and the snowfall amount.

For example, the calculating unit 160 outputs expected actual snowfall information and error information by inputting the calculated expected snowfall information to a first error artificial neural network which learns expected snowfall information, actual snowfall information corresponding to the expected snowfall information, and error information as a learning dataset and may provide the error information to the interface provided to the user terminal 200. Further, the calculating unit 160 may allow a second error artificial neural network to learn the expected actual snowfall information, the output error information, and the actual snowfall information as a learning dataset.

For example, the artificial intelligence-based learning model may be generated by artificial intelligence based learning such as machine learning or deep learning, but is not limited thereto and may be applied to various neural network systems which have been already developed or will be developed in the future.

According to the exemplary embodiment of the present disclosure, the calculating unit 160 may apply error information to calculate the expected snowfall amount information.

For example, the calculating unit 160 inputs the expected snowfall amount information and the error information output by inputting the expected snowfall amount information to the first error artificial neural network to the second error artificial neural network to calculate a final expected snowfall amount information.

According to the exemplary embodiment of the present disclosure, when a wet-bulb temperature is equal to or higher than a predetermined threshold wet-bulb temperature, the control unit 140 may measure the precipitation using the precipitation gauge 111.

For example, during the rainfall observation, when this apparatus 100 determines that the snowfall has occurred or the snowfall will occur within a predetermined time so that the control unit 140 ends rainfall observation, an observation time determining unit 130 stops a remaining rainfall observation time, and then when a wet-bulb temperature of a periphery of this apparatus 100 is equal to or higher than a threshold wet-bulb temperature and the rainfall is sensed, the observation time determining unit 130 may resume the rainfall observation with the remaining rainfall observation time at the time when it was stopped.

According to the exemplary embodiment of the present disclosure, when a wet-bulb temperature is lower than the threshold wet-bulb temperature, the control unit 140 may measure the precipitation using the snowfall amount measurement apparatus.

For example, during the snowfall observation, when this apparatus 100 determines that the rainfall has occurred or the rainfall will occur within a predetermined time so that the control unit 140 ends snowfall observation, an observation time determining unit 130 stops a remaining snowfall observation time, and then when a wet-bulb temperature of a periphery of this apparatus 100 is lower than a threshold wet-bulb temperature and the snowfall is sensed, the observation time determining unit 130 may resume the snowfall observation with the remaining snowfall observation time at the time when it was stopped. The snowfall observation apparatus may include a camera sensor 113 for observing snowfall, a ruler 114 for observing-> measuring the snowfall, and a snowfall removal member 115. When the snowfall observation apparatus is used, it may mean that at least one of the camera sensor 113 for observing snowfall and the snowfall removal member 115 is used.

FIG. 4 is a view schematically illustrating an open/close operation of a lid 111b of a precipitation gauge 111 according to an exemplary embodiment of the present disclosure.

Figure 4A:
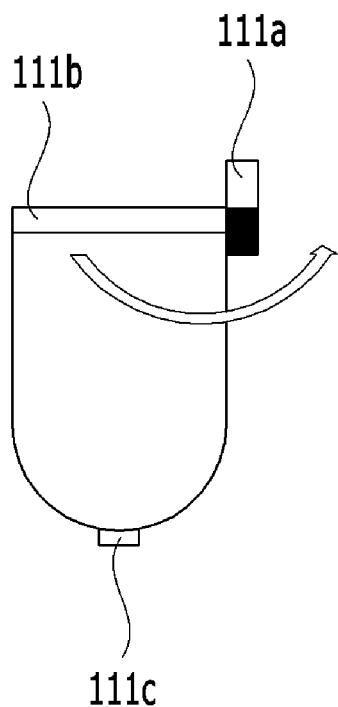
FIGS. 4A and 4B are views schematically illustrating an open/close operation of a lid of a precipitation gauge according to an exemplary embodiment of the present disclosure.
Figure 4B:
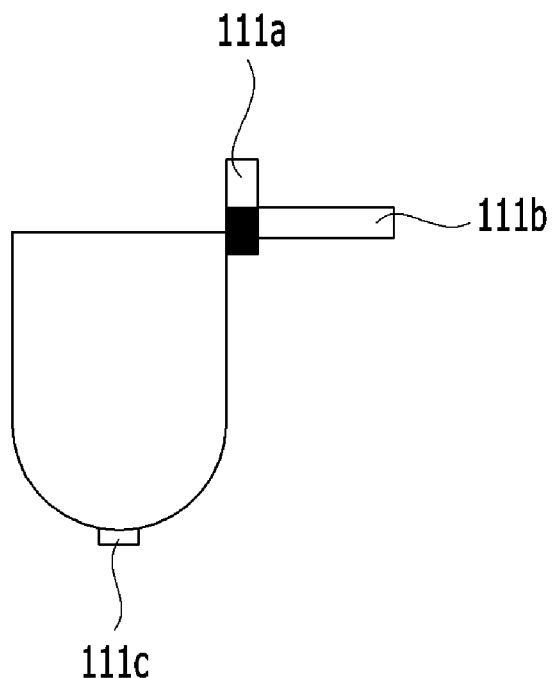

Referring to FIG. 4, the precipitation gauge 111 may include a precipitation sensing sensor 111a, a lid 111b, and a drain 111c. Referring to FIG. 4A, a closed precipitation gauge 111 may be identified and the lid 111b which blocks the precipitation gauge 111 may rotate around an axis on which the precipitation sensing sensor 111a is provided. Referring to FIG. 4B, the open precipitation gauge 111 may be identified and the lid 111b rotates around the axis on which the precipitation sensing sensor 111a is provided to open the precipitation gauge 111 so that the precipitation gauge 111 may accommodate the precipitation. However, the opening/closing method of the lid 111b is not limited to a rotation type.

According to the exemplary embodiment of the present disclosure, each of a plurality of precipitation gauges 111 may include a lid 111b which is open/closed by the control, and a drain 111c.

For example, the plurality of precipitation gauges 111 includes precipitation sensing sensors 111a and when the precipitation sensing sensor 111a senses the precipitation, the control unit 140 may control the precipitation gauge 111 to be open by horizontally rotating the lid 111b around the axis on which the precipitation sensing sensor 111a is provided. When the precipitation gauge 111 is open, the control unit 140 may horizontally rotate the lid 111b in a predetermined direction at a predetermined speed. Further, when a precipitation observation time determined by the observation time determining unit 130 has elapsed after opening the precipitation gauge 111, the control unit 140 may control the precipitation gauge 111 to be closed by horizontally rotating the lid 111b around the axis on which the precipitation sensing sensor 111a is provided. When the precipitation gauge 111 is closed, the control unit 140 may horizontally rotate the lid 111b in a predetermined direction at a predetermined speed. Further, after opening the precipitation gauge 111, even though there is a precipitation observation time determined by the observation time determining unit 130, if the precipitation observation ends, the control unit 140 may control the precipitation gauge 111 to be closed by horizontally rotating the lid 111b around the axis on which the precipitation sensing sensor 111a is provided.

Further, this apparatus 100 measures the precipitation in the precipitation gauge 111 to acquire a precipitation amount.

Further, after acquiring the precipitation amount by this apparatus 100, the control unit 140 controls the drain 111c to drain the precipitation in the precipitation gauge 111 at a predetermined drainage rate per unit time.

Further, at least one drain 111c may be provided in the precipitation gauge 111. Further, the drain 111c may be open or closed by the control of the control unit 140 and a diameter to be open and closed may be also adjusted.

Further, the precipitation gauge 111 may include a member which increases an internal pressure by the control of the control unit 140.

According to the exemplary embodiment of the present disclosure, the lid 111b may be provided on a top of the precipitation gauge 111.

For example, the lid 111b provided on the top of the precipitation gauge 111 horizontally rotates around the axis on which the precipitation sensing sensor 111a is located in the predetermined direction at the predetermined speed by the control of the control unit 140. In this case, when an error level between direction information and speed information included in a control instruction and actual direction information and actual speed information of the actual horizontal rotation of the lid 111b is equal to or larger than a predetermined level, the control unit 140 ends the observation and the moving unit 120 controls the movement member 112 to move this apparatus 100 from a second location to a first location. This apparatus 100 transmits a repair necessary notification of the lid 111b to the user terminal 200 and may transmit repair request information to a repair company terminal. The repair request information may include information about an estimated abnormal part of the lid 111b and a request deadline.

According to the exemplary embodiment of the present disclosure, the drain 111c may be provided on the bottom of the precipitation gauge 111.

For example, the drain 111c provided on the bottom of the precipitation gauge 111 drains the precipitation in the precipitation gauge 111 at a predetermined drainage rate per unit time by the control of the control unit 140. In this case, when an error level between drainage information per unit time included in a control instruction and actual drainage information per unit time of the drain 111c is equal to or larger than a predetermined level, the control unit 140 ends the drainage and the moving unit 120 controls the movement member 112 to move this apparatus 100 from the second location to the first location. This apparatus 100 transmits a repair necessary notification of the drain 111c to the user terminal 200 and may transmit repair request information to a repair company terminal. The repair request information may include information about an estimated abnormal part of the drain 111c and a request deadline.

According to the exemplary embodiment of the present disclosure, the control unit 140 may open the lid 111b for a predetermined precipitation observation time.

For example, during the precipitation observation time, the control unit 140 controls the lid 111b on the top of the precipitation gauge 111 in an open state and may control the drain 111c in a closed state.

As another example, the control unit 140 controls the lid 111b of the precipitation gauge 111 to be open and controls the drain 111c to be open, during the precipitation observation time, so that the precipitation is drained within a predetermine time after being accommodated in the precipitation gauge 111. When the precipitation is in contact with the precipitation gauge 111, this apparatus 100 acquires a precipitation amount per unit time by considering an intensity of the precipitation per unit time and a weight of precipitation sensed at the time of contact and may calculate the precipitation amount by considering the precipitation amount per unit time and the precipitation observation time.

According to the exemplary embodiment of the present disclosure, the control unit 140 may close the lid 111b after the precipitation observation time has elapsed.

For example, when the lid 111b on the top of the precipitation gauge 111 is closed, this apparatus 100 measures the precipitation in the precipitation gauge 111 to acquire the precipitation amount and then the control unit 140 may control the drain 111c to be open.

As another example, when the precipitation observation time has elapsed and the rainfall and the snowfall are not sensed after the precipitation amount measurement, the control unit 140 may control the lid 111b and the drain 111c to be open until a humidity in the precipitation gauge 111 becomes lower than a predetermined level. When the precipitation is not observed, this apparatus 100 opens the lid 111b and the drain 111c of the precipitation gauge 111 in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

Figure 5:
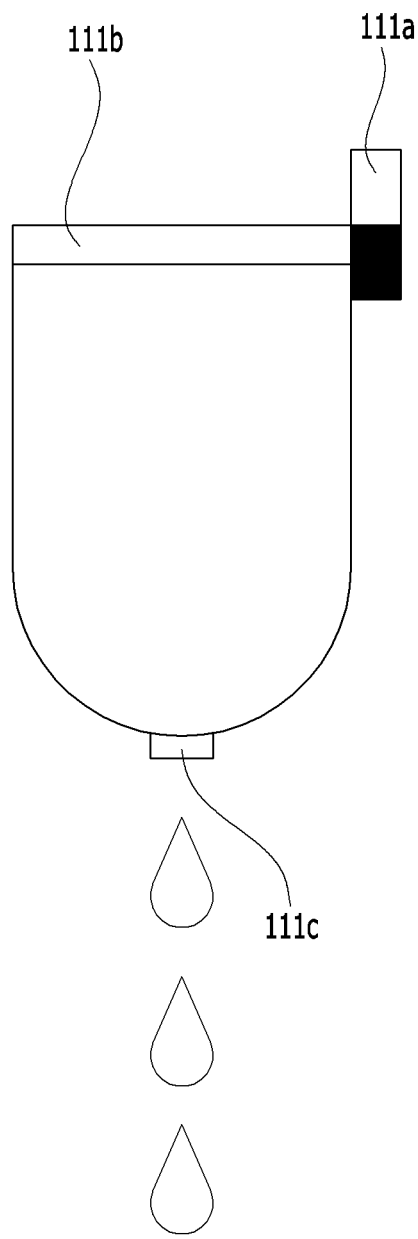
FIG. 5 is a view schematically illustrating a drainage operation of a precipitation gauge according to an exemplary embodiment of the present disclosure.

FIG. 5 is a view schematically illustrating a drainage operation of a precipitation gauge 111 according to an exemplary embodiment of the present disclosure.

Referring to FIG. 5, the precipitation gauge 111 may drain the precipitation to the drain 111c provided on the bottom by the control.

According to the exemplary embodiment of the present disclosure, when a water level of a first precipitation gauge 111 exceeds a predetermined threshold water level before ending the precipitation observation time, the control unit 140 may control a lid 111b of the first precipitation gauge 111 to be closed and a lid 111b of a second precipitation gauge 111 to be open.

For example, the first precipitation gauge 111 includes at least one precipitation gauge 111 and the second precipitation gauge 111 may include at least one precipitation gauge 111 other than the first precipitation gauge 111. The control unit 140 may set a plurality of precipitation gauges 111 which is symmetric to each other with respect to the bottom plate 110 as the first precipitation gauge 111 and the second precipitation gauge 111. As the control unit 140 sets a plurality of precipitation gauges 111 which is symmetric to each other with respect to the bottom plate 110 as the first precipitation gauge 111 and the second precipitation gauge 111 so that the operation of this apparatus 100 by the moving unit 120 while accommodating the precipitation is stably performed.

As another example, the control unit 140 may set an opening/closing speed of the drain 111c of the first precipitation gauge 111 and an opening/closing timing and opening/closing speeds of the lid 111b and the drain 111c of the second precipitation gauge 111 and opening/closing timings of the lid 111b and the drain 111c of the second precipitation gauge 111 based on at least one of an opening/closing speed of the lid 111b of the first precipitation gauge 111 and the opening/closing timing. For example, the control unit 140 sets an opening speed of the lid 111b of the first precipitation gauge 111 and a closing speed of the lid 111b of the second precipitation gauge 111 to be equal and may set a closing speed of the lid 111b of the first precipitation gauge 111 and an opening speed of the lid 111b of the second precipitation gauge 111 to be equal. Further, when this apparatus 100 senses the precipitation, but does not end the precipitation observation, the control unit 140 controls to start closing the lid 111b of the first precipitation gauge 111 at a time when the precipitation in the first precipitation gauge 111 exceeds the threshold water level after opening the lid 111b of the first precipitation gauge 111 and may control to start opening the lid 111b of the second precipitation gauge 111 at a time when the precipitation in the first precipitation gauge 111 exceeds the threshold water level after opening the lid 111b of the first precipitation gauge 111. Further, when this apparatus 100 senses the precipitation, but does not end the precipitation observation, the control unit 140 controls to start closing the lid 111b of the second precipitation gauge 111 at a time when the precipitation in the second precipitation gauge 111 exceeds the threshold water level after opening the lid 111b of the second precipitation gauge 111 and may control to start opening the lid 111b of the first precipitation gauge 111 at a time when the precipitation in the second precipitation gauge 111 exceeds the threshold water level after opening the lid 111b of the second precipitation gauge 111.

According to the exemplary embodiment of the present disclosure, when the lid 111b of the precipitation gauge 111 is closed or the observation ends, the control unit 140 senses the precipitation in the precipitation gauge 111 and then opens the drain 111c to drain the precipitation.

For example, after closing the lid 111b of the first precipitation gauge 111, the control unit 140 senses the precipitation in the first precipitation gauge 111 and then controls to start opening the drain 111c of the first precipitation gauge 111. In this case, the drainage amount per unit time of the first precipitation gauge 111 may be set such that a precipitation decrease rate in the first precipitation gauge 111 is larger than a precipitation increase rate in the second precipitation gauge 111. Further, after closing the lid 111b of the second precipitation gauge 111, the control unit 140 senses the precipitation in the second precipitation gauge 111 and then controls to start opening the drain 111c of the second precipitation gauge 111. In this case, the drainage amount per unit time of the second precipitation gauge 111 may be set such that a precipitation decrease rate in the second precipitation gauge 111 is larger than a precipitation increase rate in the first precipitation gauge 111. In order to increase the drainage amount per unit time, the control unit 140 selectively controls a plurality of drains 111c provided in the precipitation gauge 111, increases an opening diameter of the drain 111c, or may increase a pressure in the precipitation gauge 111.

FIG. 6 is a view illustrating a fence 117 angle changing operation of a precipitation observation apparatus 100 according to an exemplary embodiment of the present disclosure.

Figure 6A:
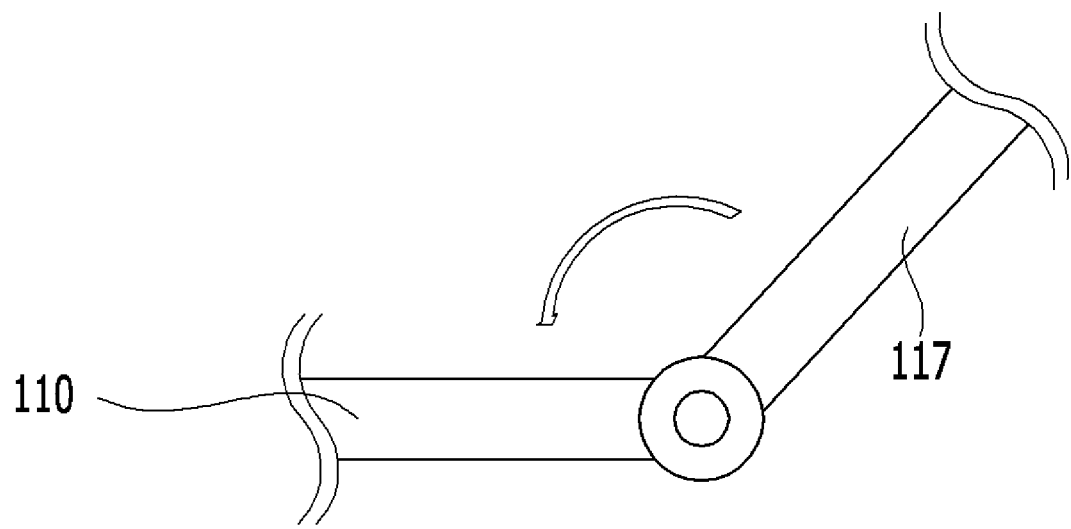
FIGS. 6A and 6B are views illustrating a fence angle changing operation of a precipitation observation apparatus according to an exemplary embodiment of the present disclosure.
Figure 6B:
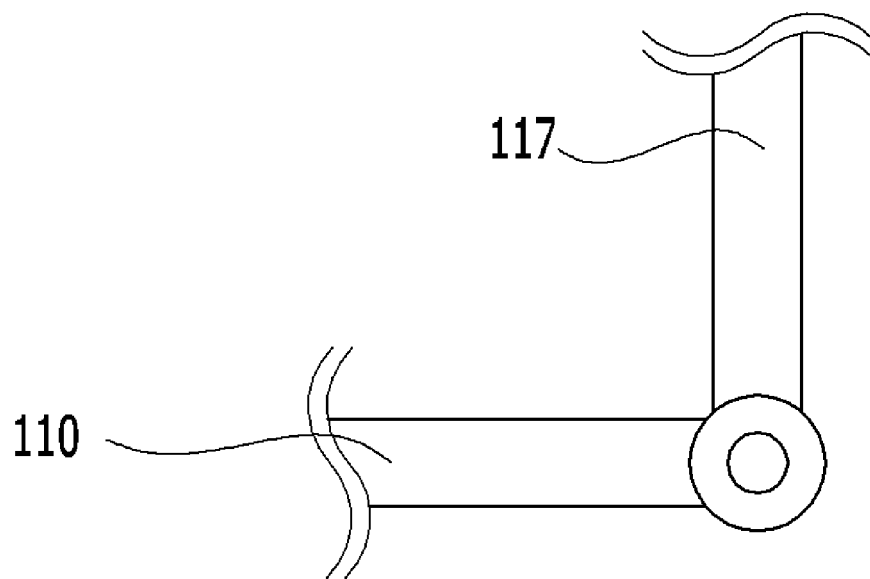

Referring to FIG. 6A, a state before the fence 117 is driven by the control may be identified and referring to FIG. 6B, a state of the fence 117 which is driven by the control so that an angle between the bottom plate 110 and the fence 117 is changed may be identified.

According to the exemplary embodiment of the present disclosure, the precipitation observation apparatus 100 may include a plurality of fences 117 which extends from the bottom plate 110 and changes an angle with the bottom plate 110 by the control.

According to the exemplary embodiment of the present disclosure, the control unit 140 may control the fence 117 to make an angle between the bottom plate 110 and the fence 117 a predetermined angle during a snowfall measurement time.

Figure 7:
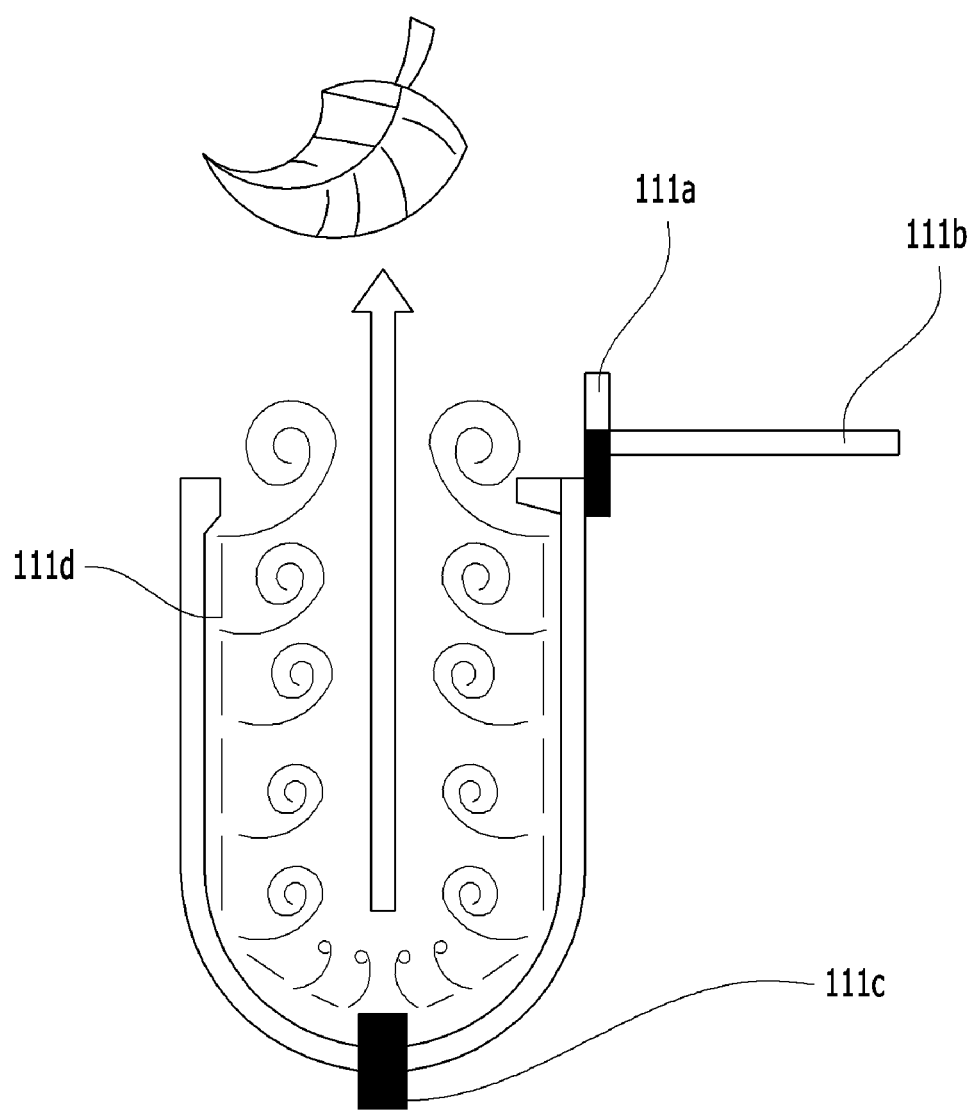
FIG. 7 is a view schematically illustrating an operation of an air-blow provided in a precipitation gauge according to an exemplary embodiment of the present disclosure.

FIG. 7 is a view schematically illustrating an operation of an air-blow 111d provided in a precipitation gauge 111 according to an exemplary embodiment of the present disclosure.

Referring to FIG. 7, the precipitation gauge 111 may include at least one air-blow 111d (nozzle of the air-blow 111d). Air is sprayed from the air-blow 111d provided in the precipitation gauge 111 so that flow of air moving from the inside to the outside of the precipitation gauge 111 is formed and foreign materials such as leaves are prevented from entering the precipitation gauge 111.

According to the exemplary embodiment of the present disclosure, when the foreign material is sensed in the precipitation gauge 111 whose lid 111b is open, the control unit 140 controls the air-blow 111d provided in the precipitation gauge 111 to discharge the foreign material to the outside.

For example, a plurality of sensors is provided in the precipitation gauge 111. When this apparatus 100 senses foreign materials in the precipitation gauge 111 whose lid 111b is open based on the sensing information, the control unit 140 selectively controls an air-blow 111d whose nozzle is not immersed in the precipitation, among a plurality of air-blows 111d provided in the precipitation gauge 111, to spray air with a predetermined spray intensity until the foreign materials are discharged to the outside of the precipitation gauge 111, based on at least one of image information and sensing information. Further, when this apparatus 100 senses that foreign materials enter the precipitation gauge 111 based on the image information generated by the camera sensor 113 which captures the precipitation gauge 111, the control unit 140 selectively controls an air-blow 111d whose nozzle is not immersed in the precipitation, among a plurality of air-blows 111d provided in the precipitation gauge 111, to spray air with a predetermined spray intensity until the foreign materials are discharged to the outside of the precipitation gauge 111, based on at least one of image information and sensing information.

As another example, when the precipitation observation time has elapsed and the rainfall or the snowfall is not sensed after measuring the precipitation amount, the control unit 140 controls the lid 111b and the drain 111c to be open until the humidity in the precipitation gauge 111 becomes lower than a predetermined level, based on the sensing information in the precipitation gauge 111 and may control the air-blow 111d provided in the precipitation gauge 111 to spray air with a predetermined spray intensity until the humidity in the precipitation gauge 111 becomes lower than a predetermined level, based on the sensing information in the precipitation gauge 111. When the precipitation is not observed, this apparatus 100 opens the lid 111b and the drain 111c of the precipitation gauge 111 and operates the air-blow 111d in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

According to the exemplary embodiment of the present disclosure, when the temperature in the precipitation gauge 111 is lower than a predetermined threshold temperature, the control unit 140 controls a heater provided in the precipitation gauge 111 to increase the temperature in the precipitation gauge 111 to be equal to or higher than a threshold temperature.

For example, when the temperature in the precipitation gauge 111 is lower than the predetermined threshold temperature based on the sensing information, the control unit 140 may control the heater provided in the precipitation gauge 111 to apply heat with a predetermined intensity to the precipitation gauge 111 until the temperature in the precipitation gauge 111 becomes equal to or higher than the threshold temperature, based on the sensing information.

As another example, when the precipitation observation time has elapsed and the rainfall or the snowfall is not sensed after measuring the precipitation amount, the control unit 140 controls the lid 111b and the drain 111c to be open until the humidity in the precipitation gauge 111 becomes lower than a predetermined level, based on the sensing information in the precipitation gauge 111, controls the air-blow 111d provided in the precipitation gauge 111 to spray air with a predetermined spray intensity until the humidity in the precipitation gauge 111 becomes lower than a predetermined level, based on the sensing information in the precipitation gauge 111, may control the heater provided in the precipitation gauge 111 to apply heat with a predetermined intensity to the precipitation gauge 111 until the humidity in the precipitation gauge 111 becomes lower than the predetermined level, based on the sensing information in the precipitation gauge 111. When the precipitation is not observed, this apparatus 100 opens the lid 111b and the drain 111c of the precipitation gauge 111 and operates the air-blow 111d and heater in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

Figure 8A:
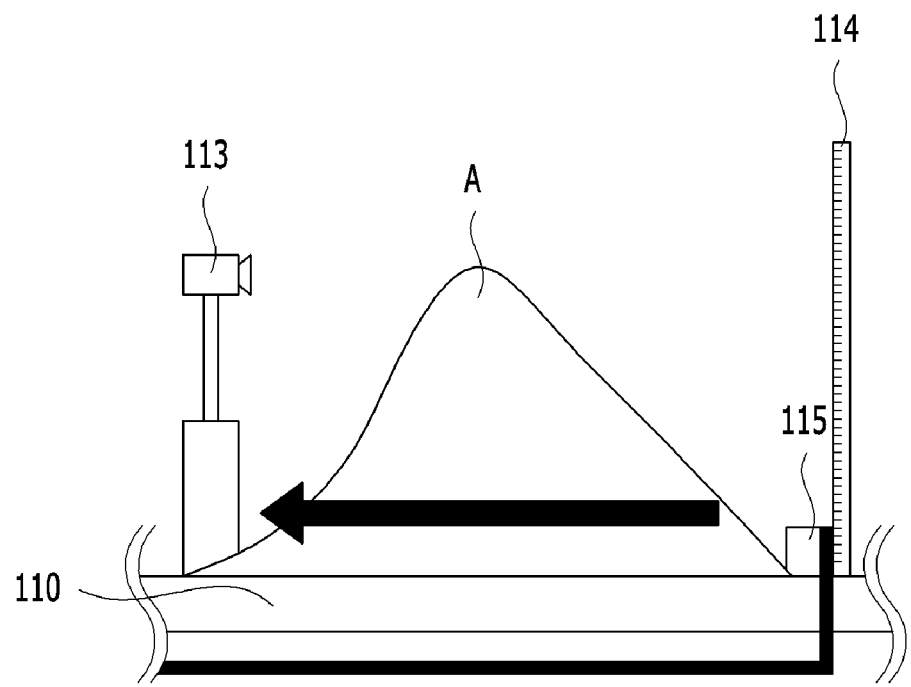
FIGS. 8A and 8B are views schematically illustrating a snowfall removal operation of a precipitation observation apparatus according to an exemplary embodiment of the present disclosure.
Figure 8B:
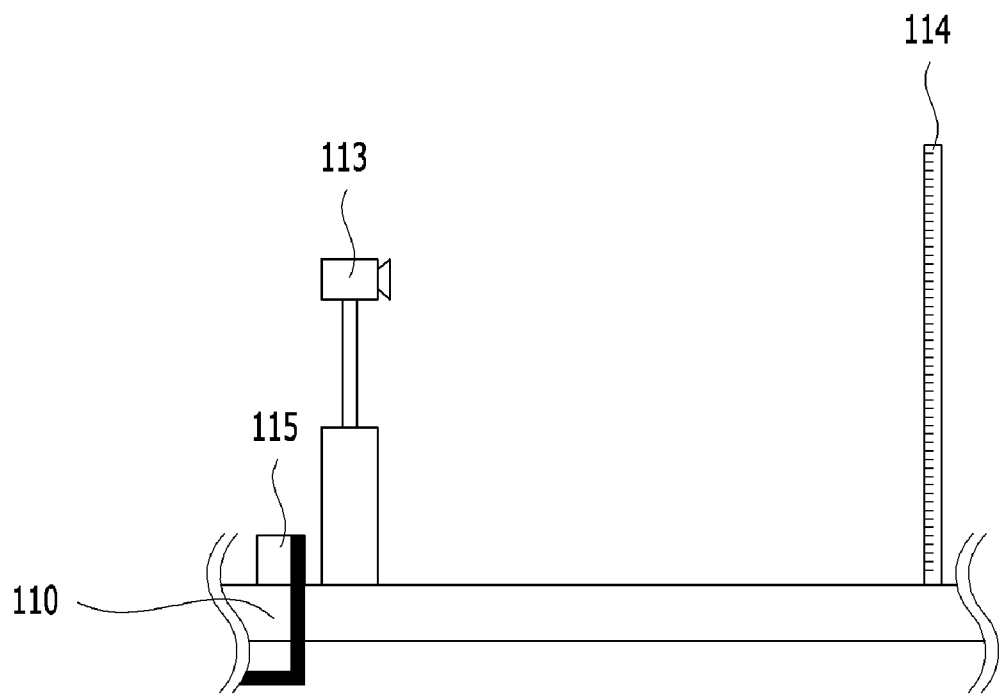

FIG. 8 is a view illustrating a snowfall removal operation of a precipitation observation apparatus 100 according to an exemplary embodiment of the present disclosure.

Referring to FIG. 8, the camera sensor 113 for capturing a ruler 114 which is provided on the bottom plate 110 to measure snowfall may capture snowfall A piled up on the bottom plate 110 and the ruler 114 for measuring the snowfall A together by the control. The snowfall removal member 115 pushes the snowfall A piled up on the bottom plate 110 from one area of the bottom plate 110 by the control. Referring to FIG. 9A, a state before the snowfall removal member 115 removes the snowfall A on the bottom plate 110 may be identified and referring to FIG. 9B, a state in which the snowfall removal member 115 pushes the snowfall A on the bottom plate 110 from one area on the bottom plate 110 while horizontally moving one side on the bottom plate 110 to the other side on the bottom plate 110 by the control is identified.

Figure 9:
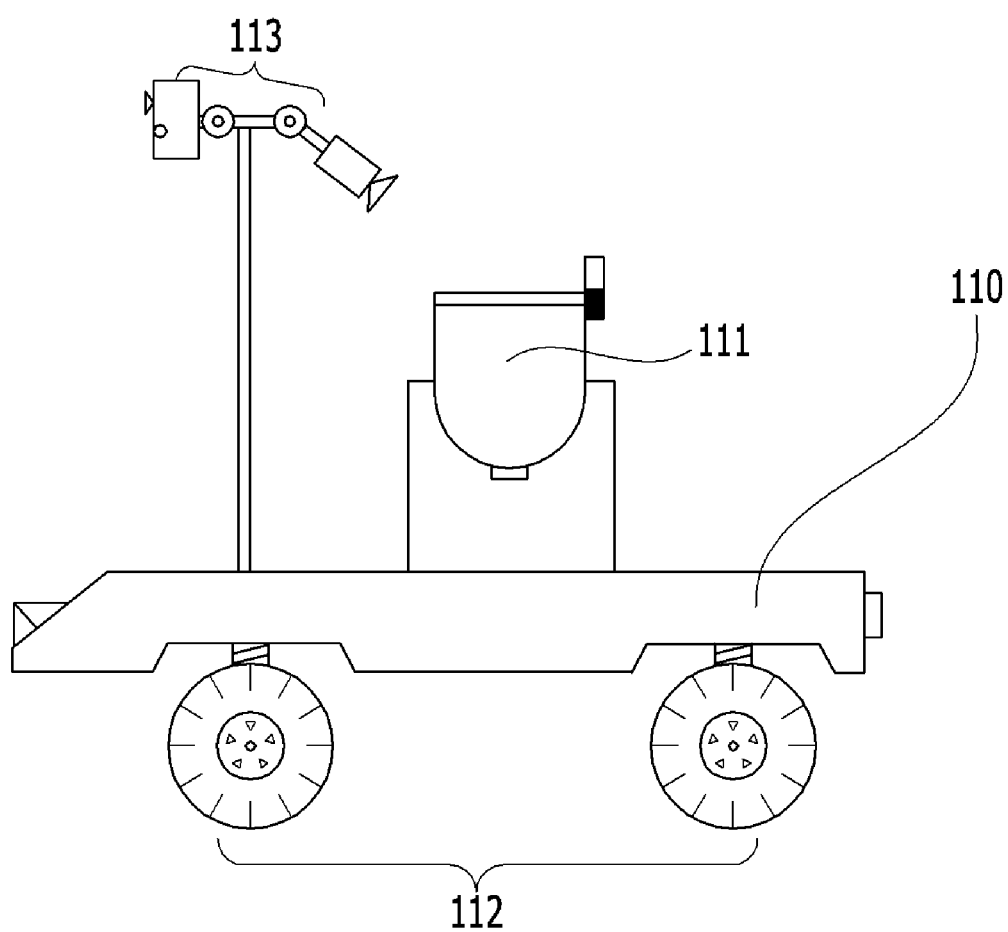
FIG. 9 is a left side view of a precipitation observation apparatus according to an exemplary embodiment of the present disclosure.

FIG. 9 is a left side view of a precipitation observation apparatus 100 according to an exemplary embodiment of the present disclosure.

Figure 10:
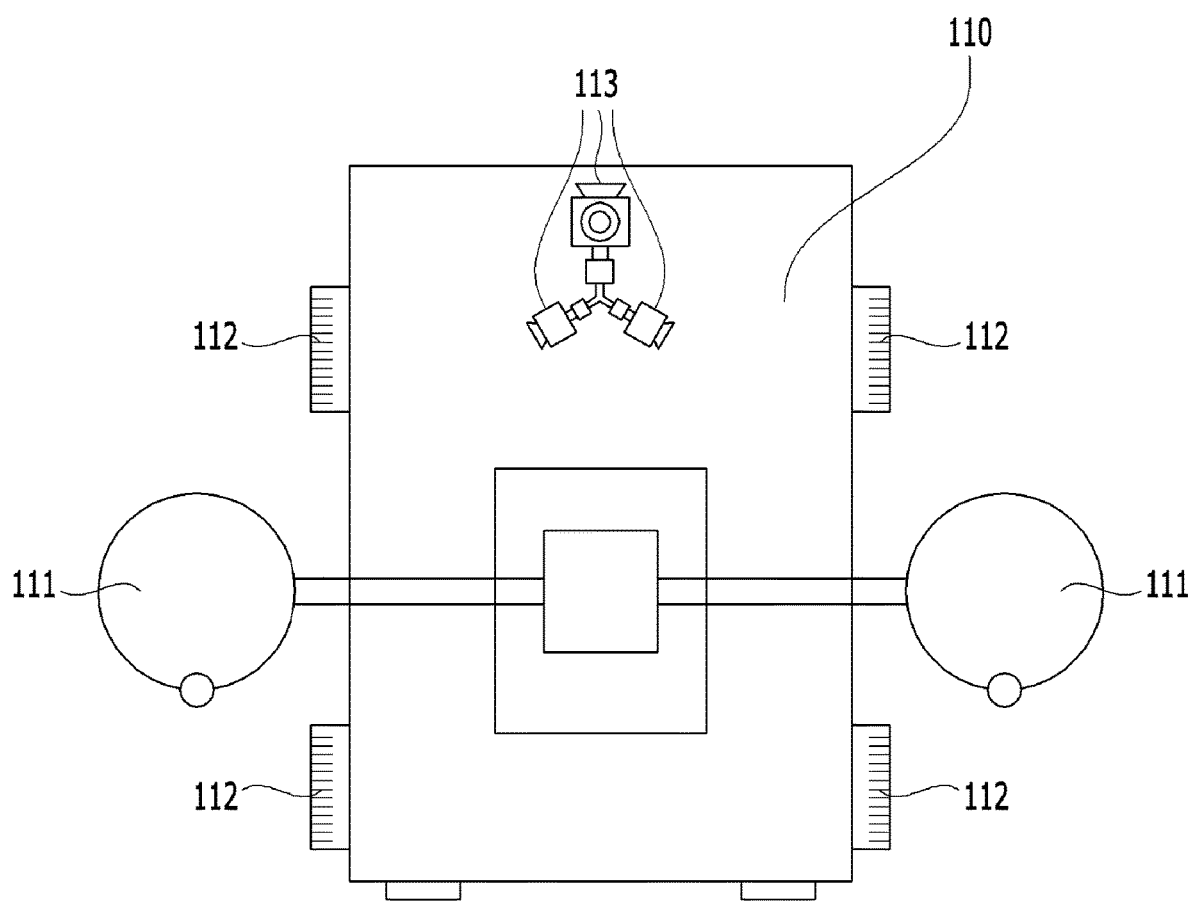
FIG. 10 is a plan view of a precipitation observation apparatus according to an exemplary embodiment of the present disclosure.

FIG. 10 is a plan view of a precipitation observation apparatus 100 according to an exemplary embodiment of the present disclosure.

Referring to FIGS. 9 and 10, this apparatus 100 includes the precipitation gauge 111, the movement member 112, and the camera sensor 113, but is not limited thereto. This apparatus 100 may include a plurality of sensors.

The precipitation gauge 111 includes a rain gauge and includes a conventional normal precipitation gauge, a conduction type precipitation gauge, a weight type precipitation gauge, a surface tension type precipitation gauge, a siphon type precipitation gauge, a radar type precipitation gauge, a piezoelectric precipitation gauge, and an optical precipitation gauge, but is not limited thereto. At least one precipitation gauge 111 may be provided in this apparatus 100.

As illustrated in FIGS. 9 and 10, the movement member 112 includes not only a vehicle type driven with wheels, but also drones, boats, or amphibious vehicles, but is not limited thereto.

The camera sensor 113 includes a camera sensor 113 for capturing the precipitation gauge 111, a camera sensor 113 for driving, a camera sensor 113 for monitoring present weather, and a camera sensor 113 for observing snowfall (also referred to as a camera sensor 113 for capturing the ruler 114 which measures the snowfall) and at least one of them may be provided in this apparatus 100.

The plurality of sensors includes a temperature sensor, a humidity sensor, a wet-bulb temperature sensor, an air pressure sensor, a wind volume sensor, a wind direction sensor, and a wind speed sensor, but is not limited thereto.

According to the exemplary embodiment of the present disclosure, the bottom plate 110 may include a plurality of precipitation gauges 111 and a movement member 112.

For example, the bottom plate 110 includes a plurality of precipitation gauges 111 which is an even number and the precipitation gauges 111 may be symmetrically provided with respect to the bottom plate 110. Further, at least one left precipitation gauge 111 is provided at the left side of the bottom plate 110 and at least one right precipitation gauge 111 may be provided at the right side of the bottom plate 110. Further, at least one front precipitation gauge 111 may be provided on the front surface of the bottom plate 110. Further, at least one rear precipitation gauge 111 may be provided on the rear surface of the bottom plate 110. The precipitation gauge 111 drains water and may be provided in a location where an interruption degree caused by the measurement and drainage processes of the precipitation gauge 111 in the moving process of the movement member 112 is lower than a predetermined degree. The precipitation gauge 111 may be provided in an extending member provided in the bottom plate 110. The plurality of precipitation gauges 111 may have the same specification.

As another example, when the movement member 112 is a vehicle type, the movement member 112 may be provided on the bottom of the bottom plate 110. Further, when the movement member 112 is a drone type, the movement member 112 is provided on the top of the bottom plate 110. Further, when the movement member 112 is a boat type, the movement member 112 is provided on the bottom and the side portion of the bottom plate 110 and a lower surface of the boat is provided on the bottom of the movement member 112 and a power source using an underwater propeller may be provided on the side portion.

According to the exemplary embodiment of the present disclosure, the moving unit 120 may move the location of the bottom plate 110 from a first location to a second location using the movement member 112.

For example, the first location and the second location may be location information where the bottom plate 110 may be located using the corresponding movement member 112. The second location may be location information where this apparatus 100 moves from the first location using the movement member 112 with an energy less than a predetermined threshold energy amount of a holding amount of the energy source of this apparatus 100. For example, when the movement member 112 is a vehicle, the first location and the second location are locations on the ground but include locations on mountainous terrain. As another example, when the movement member 112 is a drone, the first location and the second location may be locations on the ground or one location in the air. As another example, when the movement member 112 is a boat, the first location and the second location may be locations on the sea surface. As another example, when the movement member 112 is an amphibious vehicle, the first location and the second location may be locations on the ground or one location on the sea surface.

As another example, when the movement member 112 of this apparatus 100 may not move to the second location, this apparatus 100 controls another this apparatus 100 which is movable to the second location to move to the second location.

According to the exemplary embodiment of the present disclosure, the observation time determining unit 130 may determine a precipitation observation time based on seasonal information.

For example, the observation time determining unit 130 may determine a precipitation observation time based on seasonal information received from the user terminal 200 or the external server 300.

As another example, the observation time determining unit 130 calculates seasonal information based on sensing information generated using a sensor provided in this apparatus 100 and may determine a precipitation observation time based on the calculated seasonal information.

As another example, the observation time determining unit 130 calculates seasonal information based on date information and may determine a precipitation observation time based on the calculated seasonal information.

As another example, the observation time determining unit 130 calculates seasonal information based on astronomical information and may determine a precipitation observation time based on the calculated seasonal information.

As another example, the observation time determining unit 130 calculates seasonal information based on image information generated using a camera sensor 113 and may determine a precipitation observation time based on the calculated seasonal information.

As another example, the observation time determining unit 130 calculates seasonal information based on image information generated using a camera sensor 113, location information of this apparatus 100, and predetermined seasonal index organism information and may determine a precipitation observation time based on the calculated seasonal information.

As another example, the precipitation observation time may include at least one of a rainfall observation time and a snowfall observation time. The observation time determining unit 130 may determine at least one of the rainfall observation time and the snowfall observation time included in the precipitation observation time based on the seasonal information.

According to the exemplary embodiment of the present disclosure, when the rainfall is sensed, the control unit 140 may control a plurality of precipitation gauges 111 based on the precipitation observation time.

For example, when the precipitation sensing sensor 111a provided in the precipitation gauge 111 senses the precipitation, the control unit 140 may control at least one of the plurality of precipitation gauges 111, the camera sensor 113 for observing snowfall, and the snowfall removal member 115 based on the precipitation observation time. Further, when the camera sensor 113 provided in this apparatus 100 senses the precipitation, the control unit 140 may control at least one of the plurality of precipitation gauges 111, the camera sensor 113 for observing snowfall, and the snowfall removal member 115 based on the precipitation observation time. Further, the control unit 140 controls the precipitation gauge 111 based on the rainfall observation time included in the precipitation observation time and may control at least one of the camera sensor 113 for observing snowfall and the snowfall removal member 115 based on the snowfall observation time included in the precipitation observation time.

As another example, the control unit 140 measures a precipitation amount using one precipitation gauge 111 first during the precipitation observation time. However, even though the precipitation observation time does not end, a precipitation accommodated by one precipitation gauge 111 exceeds a threshold water level, the control unit stops the measurement by one precipitation gauge 111 and may measure the precipitation amount using another precipitation gauge 111. Further, the control unit 140 measures a snowfall amount using the camera sensor 113 for observing snowfall and the ruler 114 first during the snowfall observation time. However, even though the snowfall observation time does not end, the snowfall amount filed on the top of the bottom plate 110 exceeds a predetermined threshold scale of the ruler 114, the control unit pushes the snowfall from one area on the top of the bottom plate 110 using the snowfall removal member 115 and pauses the snowfall observation time while controlling the snowfall removal member 115. When the snowfall on the top of the bottom plate 110 is determined to be lower than a predetermined level based on the image information generated by the camera sensor 113 for observing the snowfall, the control unit stops the control of the snowfall removal member 115 and then resumes the consumption of the snowfall observation time which is paused to resume the snowfall observation.

According to the exemplary embodiment of the present disclosure, when the seasonal information is summer, the observation time determining unit 130 may determine the predetermined first time as a precipitation observation time.

For example, when the date information is present within a predetermined first period, the observation time determining unit 130 calculates the seasonal information as summer and determines the predetermined first time as the precipitation observation time. In this case, a predetermined a-th time included in the first time is determined as a rainfall observation time and a predetermined A-th time included in the first time may be determined as a snowfall observation time. For example, when the date information is present within a period of June 25 to June 30, July 1 to July 31, August 1 to August 31, and September 1 to September 7, the observation time determining unit 130 calculates the seasonal information as summer, determines the predetermined first time as a precipitation observation time, determines a predetermined a-th time included in the first time as a rainfall observation time and may determine a predetermined A-th time included in the first time as a snowfall observation time. For example, the a-th time is one minute and the A-th time may be 60 minutes.

As another example, when the astronomical information includes information that a position of the sun on the celestial sphere is located within an area of a circle with an imaginary line connecting the summer solstice and the autumnal equinox as a diameter, the observation time determining unit 130 calculates the seasonal information as summer, determines the predetermined first time as a precipitation observation time, determines a predetermined a-th time included in the first time as a rainfall observation time, and may determine a predetermined A-th time included in the first time as a snowfall observation time.

As another example, when the sun's southern altitude is located within a predetermined first southern altitude section in the image information obtained by capturing the sky by the camera sensor 113 for monitoring the present weather condition, the observation time determining unit 130 calculates the seasonal information as summer and determines the predetermined first time as the precipitation observation time. In this case, a predetermined a-th time included in the first time is determined as a rainfall observation time and a predetermined A-th time included in the first time may be determined as a snowfall observation time.

As another example, when the date information corresponds to a period from a first day when a daily average temperature on the year rises above a predetermined first threshold temperature and then does not fall below the first threshold temperature to the day before a first day when a daily average temperature on the year falls below the first threshold temperature and then does not rise above the first threshold temperature, the observation time determining unit 130 calculates the seasonal information as summer, determines the predetermined first time as a precipitation observation time, determines a predetermined a-th time included in the first time as a rainfall observation time, and may determine a predetermined A-th time included in the first time as a snowfall observation time. For example, the first threshold temperature may be 20° C.

As another example, when a predetermined first seasonal index organism corresponding to the location information of this apparatus is included in the image information obtained by capturing the periphery of this apparatus 100, the observation time determining unit 130 calculates the seasonal information as summer and determines the predetermined first time as the precipitation observation time. In this case, a predetermined a-th time included in the first time is determined as a rainfall observation time and a predetermined A-th time included in the first time is determined as a snowfall observation time.

According to the exemplary embodiment of the present disclosure, when the seasonal information is winter, the observation time determining unit 130 determines a predetermined second time as a precipitation observation time.

For example, when the date information is present within a predetermined second period, the observation time determining unit 130 calculates the seasonal information as winter and determines the predetermined second time as the precipitation observation time. In this case, a predetermined b-th time included in the second time is determined as a rainfall observation time and a predetermined B-th time included in the second time is determined as a snowfall observation time. For example, when the date information is present within a period of November 27 to November 30, December 1 to December 31, January 1 to January 31, and February 1 to March 1, the observation time determining unit 130 calculates the seasonal information as winter, determines the predetermined second time as a precipitation observation time, determines the predetermined b-th time included in the second time as a rainfall observation time and determines the predetermined B-th time included in the second time as a snowfall observation time. For example, the b-th time is 20 minute and the B-th time may be 10 minutes.

As another example, when the astronomical information includes information that a position of the sun on the celestial sphere is located within an area of a circle with an imaginary line connecting the winter solstice and the vernal equinox as a diameter, the observation time determining unit 130 calculates the seasonal information as winter, determines the second time as a precipitation observation time, determines the predetermined b-th time included in the second time as a rainfall observation time, and may determine the predetermined B-th time included in the second time as a snowfall observation time.

As another example, when the sun's southern altitude is located within a predetermined second southern altitude section in the image information obtained by capturing the sky, the observation time determining unit 130 calculates the seasonal information as winter and determines the second time as the precipitation observation time. In this case, a predetermined b-th time included in the second time is determined as a rainfall observation time and a predetermined B-th time included in the second time may be determined as a snowfall observation time.

As another example, when the date information corresponds to a period from a first day when a daily average temperature on the year drops below a predetermined second threshold temperature and then does not rise above the second threshold temperature to the day before a first day when a daily average temperature on the next year rises above the second threshold temperature and then does not drop below the second threshold temperature, the observation time determining unit 130 calculates the seasonal information as winter, determines the predetermined second time as a precipitation observation time, determines a predetermined b-th time included in the second time as a rainfall observation time, and may determine a predetermined B-th time included in the second time as a snowfall observation time. For example, the second threshold temperature may be 5° C.

As another example, when a predetermined second seasonal index organism corresponding to the location information of this apparatus 100 is included in the image information obtained by capturing the periphery of this apparatus 100, the observation time determining unit 130 calculates the seasonal information as winter and determines the predetermined second time as the precipitation observation time. In this case, a predetermined b-th time included in the second time is determined as a rainfall observation time and a predetermined B-th time included in the second time may be determined as a snowfall observation time.

According to the exemplary embodiment of the present disclosure, when the seasonal information is spring, the observation time determining unit 130 may determine a predetermined third time as a precipitation observation time.

For example, when the date information is present within a predetermined third period, the observation time determining unit 130 calculates the seasonal information as spring and determines the predetermined third time as the precipitation observation time. In this case, a predetermined c-th time included in the third time is determined as a rainfall observation time and a predetermined C-th time included in the third time may be determined as a snowfall observation time. For example, when the date information is present within a period of March 2 to March 31, April 1 to April 30, May 1 to May 31, and June 1 to June 24, the observation time determining unit 130 calculates the seasonal information as spring, determines the third time as a precipitation observation time, determines the predetermined c-th time included in the third time as a rainfall observation time and may determine the predetermined C-th time included in the third time as a snowfall observation time. For example, the c-th time is 10 minutes and the C-th time may be 30 minutes.

As another example, when the astronomical information includes information that a position of the sun on the celestial sphere is located within an area of a circle with an imaginary line connecting the vernal equinox and the summer solstice as a diameter, the observation time determining unit 130 calculates the seasonal information as spring, determines the third time as a precipitation observation time, determines the predetermined c-th time included in the third time as a rainfall observation time, and may determine the predetermined C-th time included in the third time as a snowfall observation time.

As another example, when the sun's southern altitude is located within a predetermined third southern altitude section in the image information obtained by capturing the sky, the observation time determining unit 130 calculates the seasonal information as spring and determines the third time as the precipitation observation time. In this case, a predetermined c-th time included in the third time is determined as a rainfall observation time and a predetermined C-th time included in the third time may be determined as a snowfall observation time.

As another example, when the date information corresponds to a period from a first day when a daily average temperature on the year rises above a predetermined second threshold temperature and then does not fall below the second threshold temperature to the day before a first day when a daily average temperature on the year rises above the first threshold temperature and then does not fall below the first threshold temperature, the observation time determining unit 130 calculates the seasonal information as spring, determines the predetermined third time as a precipitation observation time, determines a predetermined c-th time included in the third time as a rainfall observation time, and may determine a predetermined C-th time included in the third time as a snowfall observation time. For example, the first threshold temperature may be 20° C. The second threshold temperature may be 5° C.

As another example, when a predetermined third seasonal index organism corresponding to the location information of this apparatus 100 is included in the image information obtained by capturing the periphery of this apparatus 100, the observation time determining unit 130 calculates the seasonal information as spring and determines the predetermined third time as the precipitation observation time. In this case, a predetermined c-th time included in the third time is determined as a rainfall observation time and a predetermined C-th time included in the third time may be determined as a snowfall observation time.

According to the exemplary embodiment of the present disclosure, when the seasonal information is fall, the observation time determining unit 130 may determine a predetermined fourth time as a precipitation observation time.

For example, when the date information is present within a predetermined fourth period, the observation time determining unit 130 calculates the seasonal information as fall and determines the predetermined fourth time as the precipitation observation time. In this case, a predetermined d-th time included in the fourth time is determined as a rainfall observation time and a predetermined D-th time included in the fourth time is determined as a snowfall observation time. For example, when the date information is present within a period of September 8 to September 30, October 1 to October 31, and November 1 to November 26, the observation time determining unit 130 calculates the seasonal information as fall, determines the fourth time as a precipitation observation time, determines the predetermined d-th time included in the fourth time as a rainfall observation time and may determine the predetermined D-th time included in the fourth time as a snowfall observation time. For example, the d-th time is 10 minute and the D-th time may be 30 minutes.

As another example, when the astronomical information includes information that a position of the sun on the celestial sphere is located within an area of a circle with an imaginary line connecting the autumnal equinox and the winter solstice as a diameter, the observation time determining unit 130 calculates the seasonal information as fall, determines the fourth time as a precipitation observation time, determines the predetermined d-th time included in the fourth time as a rainfall observation time and may determine the predetermined D-th time included in the fourth time as a snowfall observation time.

As another example, when the sun's southern altitude is located within a predetermined fourth southern altitude section in the image information obtained by capturing the sky, the observation time determining unit 130 calculates the seasonal information as fall and determines the predetermined fourth time as the precipitation observation time. In this case, a predetermined d-th time included in the fourth time is determined as a rainfall observation time and a predetermined D-th time included in the fourth time may be determined as a snowfall observation time.

As another example, when the date information corresponds to a period from a first day when a daily average temperature on the year drops below a predetermined first threshold temperature and then does not rise above the first threshold temperature to the day before a first day when a daily average temperature on the year drops below the second threshold temperature and then does not rise above the second threshold temperature, the observation time determining unit 130 calculates the seasonal information as fall, determines the predetermined fourth time as a precipitation observation time, determines the predetermined d-th time included in the fourth time as a rainfall observation time and may determine the predetermined D-th time included in the fourth time as a snowfall observation time. For example, the first threshold temperature may be 20° C. The second threshold temperature may be 5° C.

As another example, when a predetermined fourth seasonal index organism corresponding to the location information of this apparatus 100 is included in the image information obtained by capturing the periphery of this apparatus 100, the observation time determining unit 130 calculates the seasonal information as fall and determines the predetermined fourth time as the precipitation observation time. In this case, a predetermined d-th time included in the fourth time is determined as a rainfall observation time and a predetermined D-th time included in the fourth time may be determined as a snowfall observation time.

As another example, between the a-th time and the d-th time, the a-th time is relatively shortest, the b-th time is relatively longest, and the c-th time and the d-th time are longer than the a-th time and shorter than the b-th time. The c-th time and the d-th time may be equal. Further, between the A-th time and the D-th time, the A-th time is relatively longest, the B-th time is relatively shortest, and the C-th time and the D-th time are shorter than the A-th time and longer than the B-th time. The C-th time and the D-th time may be equal.

According to the exemplary embodiment of the present disclosure, when a precipitation amount per unit time is equal to or larger than a predetermined level, the observation time determining unit 130 may reduce the precipitation observation time by a predetermined level.

For example, during the rainfall observation, when a precipitation amount per unit time within a predetermined radius of this apparatus 100 is increased to be equal to or larger than a first threshold precipitation amount per unit time, the observation time determining unit 130 may reduce the remaining precipitation observation time at a predetermined first rate. For example, when it is assumed that the first threshold precipitation amount per unit time is 7 mm/h, the precipitation amount per unit time is increased from 5 mm/h to 8 mm/h during the precipitation observation, a remaining precipitation observation time at the time when the precipitation amount per unit time is 7 mm/h is 10 minutes, and the first rate is 90%, the observation time determining unit 130 may reduce the remaining precipitation observation time from 10 minutes to 9 minutes which is 90% of 10 minutes at the time when the precipitation amount per unit time is 7 mm/h which is the first threshold precipitation amount per unit time. Further, the first threshold precipitation amount per unit time may include at least one of a first threshold rainfall amount per unit time and a first threshold snowfall amount per unit time. Further, during the rainfall observation, when a rainfall amount per unit time within a predetermined radius of this apparatus 100 is increased to be equal to or larger than a predetermined first threshold rainfall amount per unit time included in the first threshold precipitation amount per unit time, the observation time determining unit 130 may reduce the remaining rainfall observation time at a predetermined a-th rate included in the first rate. Further, during the snowfall observation, when a snowfall amount per unit time within a predetermined radius of this apparatus 100 is increased to be equal to or larger than a predetermined first threshold snowfall amount per unit time included in the first threshold precipitation amount per unit time, the observation time determining unit 130 may reduce the remaining snowfall observation time at a predetermined A-th rate included in the first rate.

In contrast, during the rainfall observation, when a precipitation amount per unit time within a predetermined radius of this apparatus 100 is reduced to be smaller than the first threshold precipitation amount per unit time, the observation time determining unit 130 may increase the remaining precipitation observation time by the reciprocal of a predetermined first rate. For example, when it is assumed that the first threshold precipitation amount per unit time is 11 mm/h, the precipitation amount per unit time falls from 12 mm/h to 10 mm/h during the precipitation observation, a remaining precipitation observation time at the time when the threshold precipitation amount per unit time is less than 10 mm/h is 8 minutes, and the first rate is 50%, the observation time determining unit 130 may increase the remaining precipitation observation time from 8 minutes to 12 minutes which is 150% of 8 minutes at the time when the precipitation amount per unit time is less than 10 mm/h which is the first threshold precipitation amount per unit time. Further, during the rainfall observation, when a rainfall amount per unit time within a predetermined radius of this apparatus 100 is reduced to be less than the first threshold rainfall amount per unit time, the observation time determining unit 130 may increase the remaining rainfall observation time by the reciprocal of an a-th rate. Further, during the snowfall observation, when a snowfall amount per unit time within a predetermined radius of this apparatus 100 is reduced to be less than the first threshold snowfall amount per unit time, the observation time determining unit 130 may increase the remaining snowfall observation time by the reciprocal of an A-th rate.

As another example, the observation time determining unit 130 may set a first threshold unit precipitation amount, a first rate corresponding to the first threshold unit precipitation amount, a n-th threshold unit precipitation amount, and a n-th rate corresponding to the n-th threshold unit precipitation amount. n may be a positive integer of 2 or larger.

According to the exemplary embodiment of the present disclosure, when the snowfall is sensed during the rainfall observation, the control unit 140 mat end the rainfall observation.

For example, when this apparatus 100 senses the snowfall while observing the rainfall, the control unit 140 ends the rainfall observation. However, after stopping the remaining rain observation time, when the snowfall which has been sensed is not sensed, but the rainfall is sensed, the observation time determining unit 130 may resume the rainfall observation with the remaining rain observation time at the time when it was stopped. Further, when this apparatus 100 senses the rainfall while observing the snowfall, the control unit 140 ends the snowfall observation. However, after stopping the remaining snowfall observation time, when the rainfall which has been sensed is not sensed, but the snowfall is sensed, the observation time determining unit 130 may resume the snowfall observation with the remaining snowfall observation time at the time when it was stopped.

As another example, during the rainfall observation of this apparatus 100, when this apparatus 100 receives information indicating that a freezing altitude is located below a predetermined altitude from the ground surface within a predetermined radius with respect to this apparatus 100 from the external server 300, this apparatus 100 determines that the snowfall has occurred or will occur within a predetermined time and the control unit 140 of this apparatus 100 may end the rainfall observation. When this apparatus 100 senses the snowfall during the rainfall observation to end the rainfall observation, the observation time determining unit 130 stops the remaining rainfall observation time and then this apparatus 100 receives the information indicating that a freezing altitude is located at a predetermined altitude or higher from the ground surface within a predetermined radius with respect to this apparatus 100 from the external server 300 and senses the rainfall, the observation time determining unit 130 may resume the rainfall observation with the remaining rainfall observation time at the time when it was stopped.

In contrast, during the snowfall observation of this apparatus 100, when this apparatus 100 receives information indicating that a freezing altitude is located at a predetermined altitude or higher from the ground surface within a predetermined radius with respect to this apparatus 100 from the external server 300, this apparatus 100 determines that the snowfall has not occurred or will not occur within a predetermined time and the control unit 140 of this apparatus 100 may end the snowfall observation. When this apparatus 100 senses the rainfall during the snowfall observation to end the snowfall observation, the observation time determining unit 130 stops the remaining snowfall observation time and then this apparatus 100 receives the information indicating that a freezing altitude is located below a predetermined altitude from the ground surface within a predetermined radius with respect to this apparatus 100 from the external server 300 and senses the snowfall, the observation time determining unit 130 may resume the snowfall observation with the remaining snowfall observation time at the time when it was stopped.

As another example, during the rainfall observation of this apparatus 100, when the temperature on the periphery of this apparatus 100 is lower than a predetermined threshold temperature, this apparatus 100 determines that the snowfall has occurred, or the snowfall will occur within a predetermined time and the control unit 140 of this apparatus 100 may end the rainfall observation. During the rainfall observation, when this apparatus 100 determines that the snowfall has occurred or the snowfall will occur within a predetermined time so that the control unit 140 ends rainfall observation, an observation time determining unit 130 stops a remaining rainfall observation time, and then when a temperature of a periphery of this apparatus 100 is equal to or higher than a threshold temperature and the rainfall is sensed, the observation time determining unit 130 may resume the rainfall observation with the remaining rainfall observation time at the time when it was stopped.

In contrast, during the snowfall observation of this apparatus 100, when the temperature on the periphery of this apparatus 100 is equal to or higher than a predetermined threshold temperature, this apparatus 100 determines that the snowfall has not occurred, or the snowfall will not occur within a predetermined time and the control unit 140 of this apparatus 100 may end the snowfall observation. During the snowfall observation, when this apparatus 100 determines that the snowfall has not occurred or the snowfall will not occur within a predetermined time so that the control unit 140 stops snowfall observation, the observation time determining unit 130 stops a remaining snowfall observation time, and then when a temperature of a periphery of this apparatus 100 is lower than a threshold temperature and the snowfall is sensed, the observation time determining unit 130 may resume the snowfall observation with the remaining snowfall observation time at the time when it was stopped.

According to the exemplary embodiment of the present disclosure, when a wet-bulb temperature is lower than a predetermined threshold wet-bulb temperature, the control unit 140 may end the rainfall observation.

As an example, during the rainfall observation of this apparatus 100, when a wet-bulb temperature on the periphery of this apparatus 100 is lower than a predetermined threshold wet-bulb temperature, this apparatus 100 determines that the snowfall has occurred, or the snowfall will occur within a predetermined time and the control unit 140 of this apparatus 100 may end the rainfall observation. During the rainfall observation, when this apparatus 100 determines that the snowfall has occurred or the snowfall will occur within a predetermined time so that the control unit 140 ends the rainfall observation, the observation time determining unit 130 may stop the remaining rainfall observation time.

In contrast, during the snowfall observation of this apparatus 100, when the wet-bulb temperature on the periphery of this apparatus 100 is equal to or higher than a predetermined threshold wet-bulb temperature, this apparatus 100 determines that the snowfall has not occurred, or the snowfall will not occur within a predetermined time and the control unit 140 of this apparatus 100 may end the snowfall observation. During the snowfall observation, when this apparatus 100 determines that the snowfall has not occurred or the snowfall will not occur within a predetermined time so that the control unit 140 ends the snowfall observation, the observation time determining unit 130 may stop the remaining snowfall observation time.

According to the exemplary embodiment of the present disclosure, when a wet-bulb temperature is equal to or higher than a threshold wet-bulb temperature, the control unit 140 may start the rainfall observation.

For example, during the rainfall observation, when this apparatus 100 determines that the snowfall has occurred or the snowfall will occur within a predetermined time so that the control unit 140 ends rainfall observation, an observation time determining unit 130 stops a remaining rainfall observation time, and then when a wet-bulb temperature of a periphery of this apparatus 100 is equal to or higher than a threshold wet-bulb temperature and the rainfall is sensed, the observation time determining unit 130 may resume the rainfall observation with the remaining rainfall observation time at the time when it was stopped.

In contrast, during the snowfall observation, when this apparatus 100 determines that the snowfall has not occurred or the snowfall will not occur within a predetermined time so that the control unit 140 ends snowfall observation, the observation time determining unit 130 stops a remaining snowfall observation time, and then when a wet-bulb temperature of a periphery of this apparatus 100 is lower than a threshold wet-bulb temperature and the snowfall is sensed, the observation time determining unit 130 may resume the snowfall observation with the remaining snowfall observation time at the time when it was stopped.

According to the exemplary embodiment of the present disclosure, when a water equivalent ratio is equal to or higher than a predetermined level, the control unit 140 may end the rainfall observation.

As an example, during the rainfall observation of this apparatus 100, when a water equivalent ratio for a peripheral atmosphere of this apparatus 100 is equal to or higher than a predetermined level, this apparatus 100 determines that the snowfall has occurred, or the snowfall will occur within a predetermined time and the control unit 140 of this apparatus 100 may end the rainfall observation. During the rainfall observation, when this apparatus 100 determines that the snowfall has occurred or the snowfall will occur within a predetermined time so that the control unit 140 ends rainfall observation, an observation time determining unit 130 stops a remaining rainfall observation time, and then when a water equivalent ratio for a peripheral atmosphere of this apparatus 100 is lower than a predetermined level and the rainfall is sensed, the observation time determining unit 130 may resume the rainfall observation with the remaining rainfall observation time at the time when it was stopped.

In contrast, during the snowfall observation of this apparatus 100, when the water equivalent ratio for a peripheral atmosphere of this apparatus 100 is lower than a predetermined level, this apparatus 100 determines that the snowfall has not occurred or the snowfall will not occur within a predetermined time and the control unit 140 of this apparatus 100 may end the snowfall observation. During the snowfall observation, when this apparatus 100 determines that the snowfall has not occurred or the snowfall will not occur within a predetermined time so that the control unit 140 ends snowfall observation, the observation time determining unit 130 stops a remaining snowfall observation time, and then when a water equivalent ratio for a peripheral atmosphere of this apparatus 100 is equal to or higher than a predetermined level and the snowfall is sensed, the observation time determining unit 130 may resume the snowfall observation with the remaining snowfall observation time at the time when it was stopped.

According to the exemplary embodiment of the present disclosure, when a snow density is lower than a predetermined level, the control unit 140 may end the rainfall observation.

For example, during the rainfall observation of this apparatus 100, when a snow density for a peripheral atmosphere of this apparatus 100 is lower than a predetermined level, this apparatus 100 determines that the snowfall has occurred, or the snowfall will occur within a predetermined time and the control unit 140 of this apparatus 100 may end the rainfall observation. During the rainfall observation, when this apparatus 100 determines that the snowfall has occurred or the snowfall will occur within a predetermined time so that the control unit 140 ends the rainfall observation, an observation time determining unit 130 stops a remaining rainfall observation time, and then when a snow density for a peripheral atmosphere of this apparatus 100 is equal to or higher than a predetermined level and the rainfall is sensed, the observation time determining unit 130 may resume the rainfall observation with the remaining rainfall observation time at the time when it was stopped.

In contrast, during the snowfall observation of this apparatus 100, when the snow density for a peripheral atmosphere of this apparatus 100 is equal to or higher than a predetermined level, this apparatus 100 determines that the snowfall has not occurred, or the snowfall will not occur within a predetermined time and the control unit 140 of this apparatus 100 may end the snowfall observation. During the snowfall observation, when this apparatus 100 determines that the snowfall has not occurred or the snowfall will not occur within a predetermined time so that the control unit 140 ends snowfall observation, the observation time determining unit 130 stops a remaining snowfall observation time, and then when a snow density for a peripheral atmosphere of this apparatus 100 is lower than a predetermined level and the snowfall is sensed, the observation time determining unit 130 may resume the snowfall observation with the remaining snowfall observation time at the time when it was stopped.

For example, when this apparatus 100 determines that the snowfall has occurred or the snowfall will occur within a predetermined time, it may be the same meaning as the sensing of the snowfall. In contrast, when this apparatus 100 determines that the rainfall has occurred or the rainfall will occur within a predetermined time, it may be the same meaning as the sensing of the rainfall.

According to the exemplary embodiment of the present disclosure, each of a plurality of precipitation gauges 111 may include a lid 111*b* which is opened/closed under the control, and a drain 111*c*.

For example, the plurality of precipitation gauges 111 includes precipitation sensing sensors 111*a* and when the precipitation sensing sensor 111*a* senses the precipitation, the control unit 140 controls the precipitation gauge 111 to be open by horizontally rotating the lid 111*b* around the axis on which the precipitation sensing sensor 111*a* is provided. When the precipitation gauge 111 is open, the control unit 140 may horizontally rotate the lid 111*b* in a predetermined direction at a predetermined speed. When a precipitation observation time determined by the observation time determining unit 130 has elapsed after opening the precipitation gauge 111, the control unit 140 may control the precipitation gauge 111 to be closed by horizontally rotating the lid 111*b* around the axis on which the precipitation sensing sensor 111*a* is provided. When the precipitation gauge 111 is closed, the control unit 140 may horizontally rotate the lid 111*b* in a predetermined direction at a predetermined speed. Further, after opening the precipitation gauge 111, even though there is a precipitation observation time determined by the observation time determining unit 130, if the precipitation observation ends, the control unit 140 may control the precipitation gauge 111 to be closed by horizontally rotating the lid 111*b* around the axis on which the precipitation sensing sensor 111*a* is provided.

Further, this apparatus 100 measures the precipitation in the precipitation gauge 111 to acquire a precipitation amount.

Further, after acquiring the precipitation amount of this apparatus 100, the control unit 140 controls the drain 111*c* to drain the precipitation in the precipitation gauge 111 at a predetermined drainage rate per unit time. Here, when this apparatus 100 acquires a precipitation amount, it may mean that this apparatus 100 senses the precipitation in the precipitation gauge 111 to calculate the precipitation amount.

Further, at least one drain 111*c* may be provided in the precipitation gauge 111. Further, the drain 111*c* is open or closed under the control and a diameter to be open and closed may be also adjusted.

Further, the precipitation gauge 111 may include a member which increases an internal pressure under the control. The precipitation gauge 111 raises a pressure in the precipitation gauge 111 to be equal to or higher than a predetermined level using a member which increases the internal pressure by the control, while draining the precipitation, to increase a precipitation discharging speed.

According to the exemplary embodiment of the present disclosure, the lid 111*b* may be provided on the top of the precipitation gauge 111.

For example, the lid 111*b* provided on the top of the precipitation gauge 111 horizontally rotates around the axis on which the precipitation sensing sensor 111*a* is located in the predetermined direction at the predetermined speed by the control of the control unit 140. In this case, when an error level between direction information and speed information included in a control instruction and actual direction information and actual speed information of the actual horizontal rotation of the lid 111*b* is equal to or larger than a predetermined level, the control unit 140 stops the observation and the moving unit 120 controls the movement member 112 to move this apparatus 100 from a second location to a first location. This apparatus 100 transmits a repair necessary notification of the lid 111*b* to the user terminal 200 and may transmit repair request information to a repair company terminal. The repair request information may include information about an estimated abnormal part of the lid 111*b* and a request deadline.

According to the exemplary embodiment of the present disclosure, the drain 111*c* may be provided on the bottom of the precipitation gauge 111.

For example, the drain 111*c* provided on the bottom of the precipitation gauge 111 drains the precipitation in the precipitation gauge 111 at a predetermined drainage rate per unit time by the control of the control unit 140. In this case, when an error level between drainage information per unit time included in a control instruction and actual drainage information per unit time of the drain 111*c* is equal to or larger than a predetermined level, the control unit 140 stops the drainage and the moving unit 120 controls the movement member 112 to move this apparatus 100 from the second location to the first location. This apparatus 100 transmits a repair necessary notification of the drain 111c to the user terminal 200 and may transmit repair request information to a repair company terminal. The repair request information may include information about an estimated abnormal part of the drain 111c and a request deadline.

According to the exemplary embodiment of the present disclosure, the control unit 140 may open the lid 111b for a precipitation observation time.

For example, during the precipitation observation time, the control unit 140 controls the lid 111b on the top of the precipitation gauge 111 in an open state and may control the drain 111c in a closed state.

As another example, the control unit 140 controls the lid 111b of the precipitation gauge 111 to be open and controls the drain 111c to be open, during the precipitation observation time, so that the precipitation is drained within a predetermine time after being accommodated in the precipitation gauge 111. When the precipitation is in contact with the precipitation gauge 111, this apparatus 100 acquires a precipitation amount per unit time by considering an intensity of the precipitation per unit time and a weight of precipitation sensed at the time of contact and may calculate the precipitation amount by considering the precipitation amount per unit time and the precipitation observation time.

According to the exemplary embodiment of the present disclosure, the control unit 140 may close the lid 111b after the predetermined precipitation observation time has elapsed.

For example, when the lid 111b on the top of the precipitation gauge 111 is closed, this apparatus 100 measures the precipitation in the precipitation gauge 111 to acquire the precipitation amount and then the control unit 140 may control the drain 111c to be open.

As another example, when the precipitation observation time has elapsed and the rainfall and the snowfall are not sensed after the precipitation amount measurement, the control unit 140 may control the lid 111b and the drain 111c to be in the open states until a humidity in the precipitation gauge 111 becomes lower than a predetermined level. When the precipitation is not observed, this apparatus 100 opens the lid 111b and the drain 111c of the precipitation gauge 111 in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

According to the exemplary embodiment of the present disclosure, when a water level of a first precipitation gauge 111 exceeds a predetermined threshold water level before ending the precipitation observation time, the control unit 140 closes a lid 111b of the first precipitation gauge 111 and may open a lid 111b of a second precipitation gauge 111.

For example, the first precipitation gauge 111 includes at least one precipitation gauge 111 and the second precipitation gauge 111 may include at least one precipitation gauge 111 other than the first precipitation gauge 111. The control unit 140 may set a plurality of precipitation gauges 111 which is symmetric to each other with respect to the bottom plate 110 as the first precipitation gauge 111 and the second precipitation gauge 111. As the control unit 140 sets a plurality of precipitation gauges 111 which is symmetric to each other with respect to the bottom plate 110 as the first precipitation gauge 111 and the second precipitation gauge 111 so that the operation of this apparatus 100 by the moving unit 120 while accommodating the precipitation is stably performed.

As another example, the control unit 140 may set an opening/closing speed of the drain 111c of the first precipitation gauge 111 and an opening/closing timing and opening/closing speeds of the lid 111b and the drain 111c of the second precipitation gauge 111 and opening/closing timings of the lid 111b and the drain 111c of the second precipitation gauge 111 based on at least one of an opening/closing speed of the lid 111b of the first precipitation gauge 111 and the opening/closing timing. For example, the control unit 140 sets an opening speed of the lid 111b of the first precipitation gauge 111 and a closing speed of the lid 111b of the second precipitation gauge 111 to be equal and may set a closing speed of the lid 111b of the first precipitation gauge 111 and an opening speed of the lid 111b of the second precipitation gauge 111 to be equal. Further, when this apparatus 100 senses the precipitation, but does not end the precipitation observation, the control unit 140 controls to start closing the lid 111b of the first precipitation gauge 111 at a time when the precipitation in the first precipitation gauge 111 exceeds the threshold water level after opening the lid 111b of the first precipitation gauge 111 and may control to start opening the lid 111b of the second precipitation gauge 111 at a time when the precipitation in the first precipitation gauge 111 exceeds the threshold water level after opening the lid 111b of the first precipitation gauge 111. Further, when this apparatus 100 senses the precipitation, but does not end the precipitation observation, the control unit 140 controls to start closing the lid 111b of the second precipitation gauge 111 at a time when the precipitation in the second precipitation gauge 111 exceeds the threshold water level after opening the lid 111b of the second precipitation gauge 111 and may control to start opening the lid 111b of the first precipitation gauge 111 at a time when the precipitation in the second precipitation gauge 111 exceeds the threshold water level after opening the lid 111b of the second precipitation gauge 111.

According to the exemplary embodiment of the present disclosure, when the lid 111b of the precipitation gauge 111 is closed or the observation ends, the control unit 140 senses the precipitation in the precipitation gauge 111 and then opens the drain 111c to discharge the precipitation.

For example, after closing the lid 111b of the first precipitation gauge 111, the control unit 140 senses the precipitation in the precipitation gauge 111 and then controls to start opening the drain 111c of the first precipitation gauge 111. In this case, the drainage amount per unit time of the first precipitation gauge 111 may be set such that a precipitation decrease rate in the first precipitation gauge 111 is larger than a precipitation increase rate in the second precipitation gauge 111. Further, after closing the lid 111b of the second precipitation gauge 111, the control unit 140 senses the precipitation in the second precipitation gauge 111 and then controls to start opening the drain 111c of the second precipitation gauge 111. In this case, the drainage amount per unit time of the second precipitation gauge 111 may be set such that a precipitation decrease rate in the second precipitation gauge 111 is larger than a precipitation increase rate in the first precipitation gauge 111. In order to increase the drainage amount per unit time, the control unit 140 selectively controls a plurality of drains 111c provided in the precipitation gauge 111, increases an opening diameter of the drain 111c, or may increase a pressure in the precipitation gauge 111.

According to the exemplary embodiment of the present disclosure, when the foreign material is sensed in the precipitation gauge 111 whose lid 111b is open, the control unit 140 controls the air-blow 111d provided in the precipitation gauge 111 to discharge the foreign material to the outside.

For example, a plurality of sensors is provided in the precipitation gauge 111. When this apparatus 100 senses foreign materials in the precipitation gauge 111 whose lid 111b is open based on the sensing information, the control unit 140 selectively controls an air-blow 111d whose nozzle is not immersed in the precipitation, among a plurality of air-blows 111d provided in the precipitation gauge 111, to spray air with a predetermined spray intensity until the foreign materials are discharged to the outside of the precipitation gauge 111, based on at least one of image information and sensing information. Further, when this apparatus 100 senses that foreign materials enter the precipitation gauge 111 based on the image information generated by the camera sensor 113 which captures the precipitation gauge 111, the control unit 140 selectively controls an air-blow 111d whose nozzle is not immersed in the precipitation, among a plurality of air-blows 111d provided in the precipitation gauge 111, to spray air with a predetermined spray intensity until the foreign materials are discharged to the outside of the precipitation gauge 111, based on at least one of image information and sensing information.

As another example, when the precipitation observation time has elapsed and the rainfall or the snowfall is not sensed after measuring the precipitation amount, the control unit 140 controls the lid 111b and the drain 111c to be open until the humidity in the precipitation gauge 111 becomes lower than a predetermined level, based on the sensing information in the precipitation gauge 111 and controls the air-blow 111d provided in the precipitation gauge 111 to spray air with a predetermined spray intensity until the humidity in the precipitation gauge 111 becomes lower than a predetermined level, based on the sensing information in the precipitation gauge 111. When the precipitation is not observed, this apparatus 100 opens the lid 111b and the drain 111c of the precipitation gauge 111 and operates the air-blow 111d in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

According to the exemplary embodiment of the present disclosure, when the temperature in the precipitation gauge 111 is lower than a predetermined threshold temperature, the control unit 140 controls a heater provided in the precipitation gauge 111 to increase the temperature in the precipitation gauge 111 to be equal to or higher than a threshold temperature.

For example, when the temperature in the precipitation gauge 111 is lower than the predetermined threshold temperature based on the sensing information, the control unit 140 may control the heater provided in the precipitation gauge 111 to apply heat with a predetermined intensity to the precipitation gauge 111 until the temperature in the precipitation gauge 111 becomes equal to or higher than the threshold temperature, based on the sensing information.

As another example, when the precipitation observation time has elapsed and the rainfall or the snowfall is not sensed after measuring the precipitation amount, the control unit 140 controls the lid 111b and the drain 111c to be open until the humidity in the precipitation gauge 111 becomes lower than a predetermined level, based on the sensing information in the precipitation gauge 111, controls the air-blow 111d provided in the precipitation gauge 111 to spray air with a predetermined spray intensity until the humidity in the precipitation gauge 111 becomes lower than a predetermined level, based on the sensing information in the precipitation gauge 111, controls the heater provided in the precipitation gauge 111 to apply heat with a predetermined intensity to the precipitation gauge 111 until the humidity in the precipitation gauge 111 becomes lower than a predetermined level, based on the sensing information in the precipitation gauge 111. When the precipitation is not observed, this apparatus 100 opens the lid 111b and the drain 111c of the precipitation gauge 111 and operates the air-blow 111d and heater in a climate in which the rainfall and the snowfall do not occur to increase an evaporation rate in the precipitation gauge 111. By doing this, an accuracy of the precipitation measurement amount at the time of measuring the precipitation amount using the precipitation gauge 111 may be increased in the future.

Hereinafter, an operation flow of the present disclosure will be described in brief based on the above detailed description.

Figure 11:
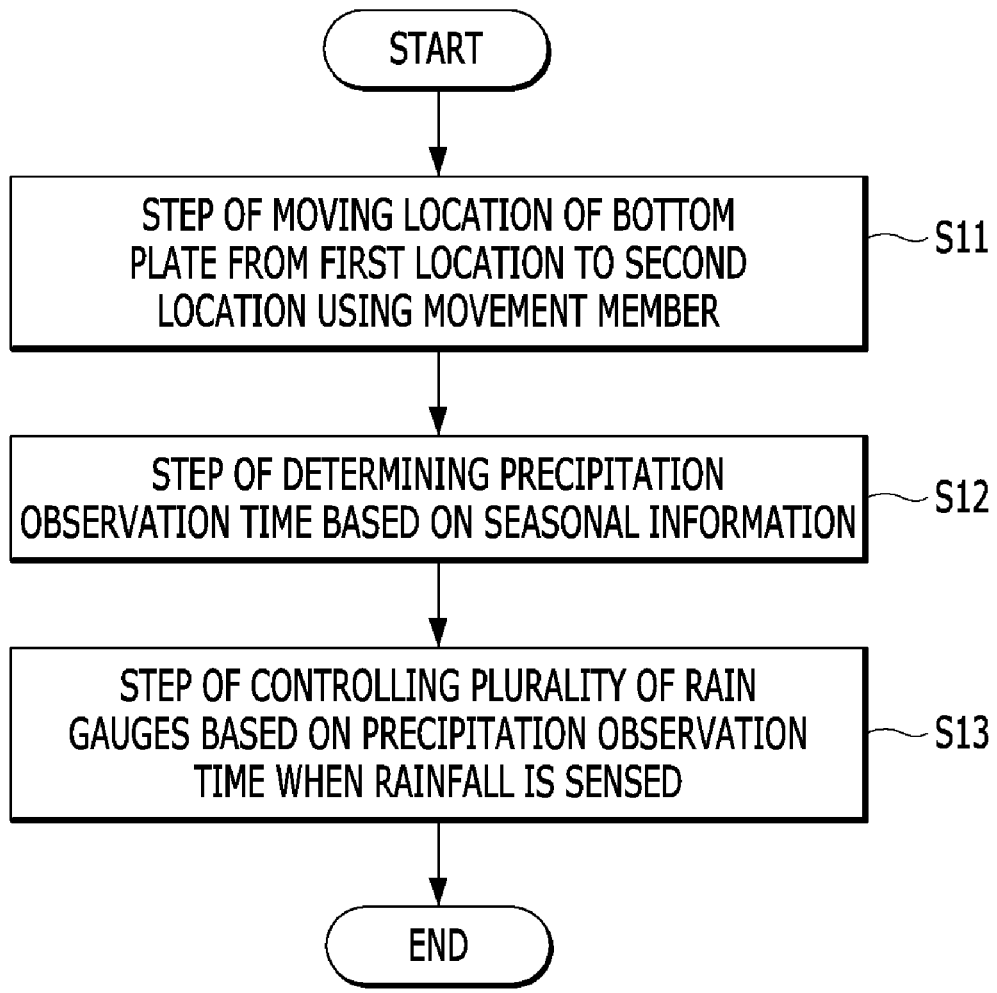
FIG. 11 is a flowchart of an operation of a control method of a precipitation observation apparatus according to an exemplary embodiment of the present disclosure.

FIG. 11 is a flowchart of an operation of a control method of a precipitation observation apparatus 100 according to an exemplary embodiment of the present disclosure.

Figure 12:
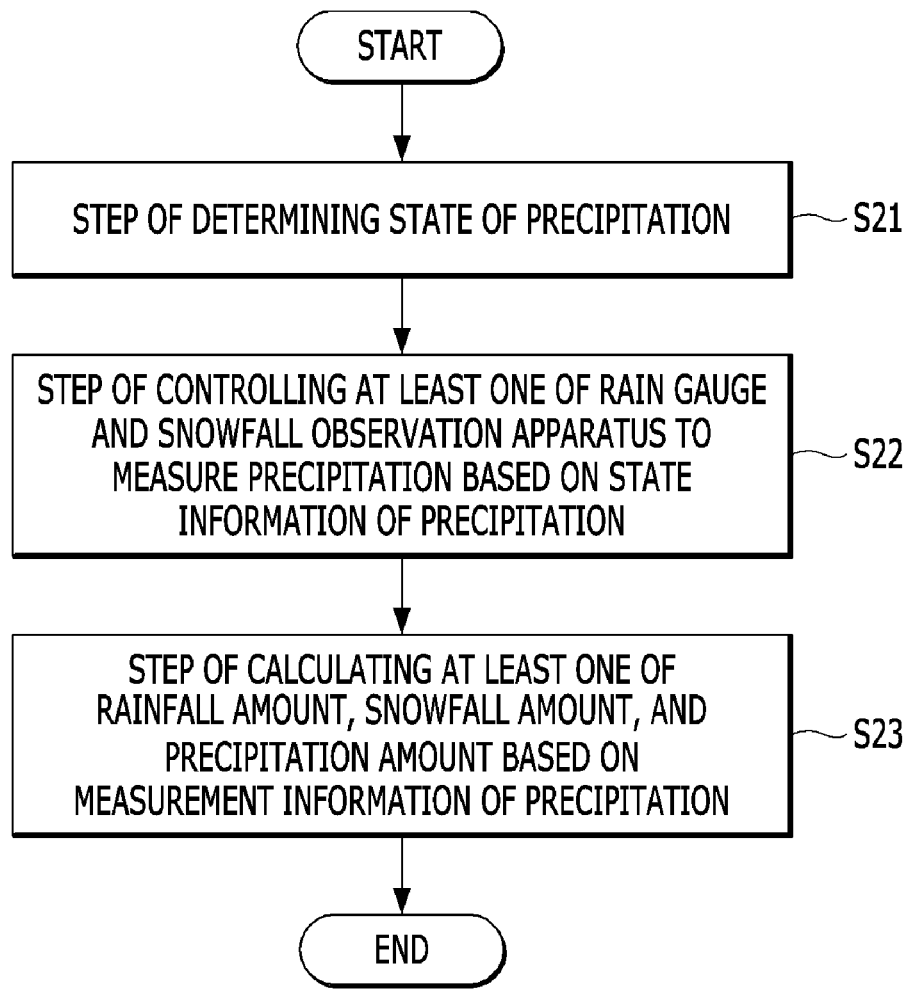
FIG. 12 is a flowchart of an operation of a control method of a precipitation observation apparatus according to an exemplary embodiment of the present disclosure.

FIG. 12 is a flowchart of an operation of a control method of a precipitation observation apparatus 100 according to an exemplary embodiment of the present disclosure.

The control method (hereinafter, also referred to as this method) of the precipitation observation apparatus 100 illustrated in FIGS. 11 and 12 will be performed by the above-described precipitation observation apparatus 100. Therefore, even though some contents are omitted below, the contents which have been described for the precipitation observation apparatus 100 may be applied to the description for the control method of the precipitation observation apparatus 100 in the same way.

Referring to FIG. 11, this method may include steps S11 to S13.

In step S11, the moving unit 120 may move the location of the bottom plate 110 from a first location to a second location using the movement member 112.

Next, in step S12, the observation time determining unit 130 may determine a precipitation observation time based on seasonal information.

Next, in step S13, when the precipitation is sensed, the control unit 140 may control a plurality of precipitation gauges 111 based on the precipitation observation time.

Referring to FIG. 12, this method may include steps S21 to S23.

In step S21, the determining unit 150 may determine a state of the precipitation.

Next in step S22, the control unit 140 may control at least one of the precipitation gauge 111 and the snowfall observation apparatus to measure precipitation based on the state information of the precipitation.

Next, in step S23, the calculating unit 160 may calculate at least one of a rainfall amount, a snowfall amount, and a precipitation amount based on the measurement information of the precipitation.

In the above-description, steps S11 to S13 and steps S21 to S23 may be further divided into additional steps or combined as smaller steps depending on an implementation example of the present disclosure. Further, some steps may be omitted if necessary and the order of steps may be changed.

The control method of the precipitation observation apparatus 100 according to the exemplary embodiment of the present invention may be implemented as a program command which may be executed by various computers to be recorded in a computer readable medium. The computer readable medium may include solely a program command, a data file, and a data structure or a combination thereof. The program instruction recorded in the medium may be specifically designed or constructed for the present disclosure or known to those skilled in the art of a computer software to be used. Examples of the computer readable recording medium include a magnetic media such as a hard disk, a floppy disk, and a magnetic tape, an optical media such as a CD-ROM or a DVD, a magneto-optical media such as a floptical disk, and a hardware device which is specifically configured to store and execute the program command such as a ROM, a RAM, and a flash memory. Examples of the program command include not only a machine language code which is created by a compiler but also a high-level language code which may be executed by a computer using an interpreter. The hardware device may operate as one or more software modules in order to perform the operation of the present disclosure and vice versa.

Further, the above-described control method of the precipitation observation apparatus 100 may also be implemented as a computer program or an application executed by a computer which is stored in a recording medium.

The above description of the present disclosure is illustrative only and it is understood by those skilled in the art that the present disclosure may be easily modified to another specific type without changing the technical spirit of an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A precipitation observation apparatus, comprising:
    a bottom plate on which a precipitation gauge and a snowfall observation apparatus are provided;
    a determining unit which determines a state of a precipitation;
    a control unit which controls at least one of the precipitation gauge and the snowfall observation apparatus to measure the precipitation based on state information of the precipitation; and
    a calculating unit which calculates at least one of a rainfall amount, a snowfall amount, and a precipitation amount based on measurement information of the precipitation,
    wherein the determining unit determines whether the state of precipitation is snow or rain,
    wherein when the state of precipitation is snow, the determining unit determines the state of snow as any one of dry snow and wet snow,
    wherein the calculating unit calculates at least one of a snow density and a water equivalent ratio based on the precipitation amount and the snowfall amount,
    wherein the calculating unit calculates expected snowfall amount information based on the water equivalent ratio,
    wherein the calculating unit calculates error information based on the expected snowfall amount information and the snowfall amount and applies the error information to calculate the expected snowfall amount information.

2. The precipitation observation apparatus according to claim 1, wherein the determining unit determines the state of snow as any one of dry snow and wet snow based on the snow density and the water equivalent ratio.

3. The precipitation observation apparatus according to claim 1, wherein when a wet-bulb temperature is equal to or higher than a predetermined threshold wet-bulb temperature, the control unit measures the precipitation using the precipitation gauge and when the wet-bulb temperature is lower than the predetermined threshold wet-bulb temperature, the control unit measures the precipitation using the snowfall observation apparatus.

4. The precipitation observation apparatus according to claim 1, wherein a plurality of precipitation gauges each includes a lid and a drain which are open/closed by control, the lid is provided on a top of the precipitation gauge, the drain is provided on a bottom of the precipitation gauge, and the control unit opens the lid during a predetermined precipitation observation time and closes the lid when the precipitation observation time has elapsed.

5. The precipitation observation apparatus according to claim 4, wherein when a water level of a first precipitation gauge exceeds a predetermined threshold water level before the precipitation observation time ends, the control unit controls a lid of the first precipitation gauge to be closed and controls a lid of a second precipitation gauge to be open and when the lid of the precipitation gauge is closed or the observation ends, the control unit senses the precipitation in the precipitation gauge and then opens the drain to drain the precipitation.

6. The precipitation observation apparatus according to claim 1, further comprising:
    a plurality of fences which extends from the bottom plate, an angle with the bottom plate being changed by control,
    wherein the control unit controls the fence to form a predetermined angle between the bottom plate and the fence during snowfall measurement time.

7. The precipitation observation apparatus according to claim 4, wherein when a foreign material is sensed in the precipitation gauge whose lid is open, the control unit controls an air-blow provided in the precipitation gauge to discharge the foreign material to the outside.

8. The precipitation observation apparatus according to claim 1, wherein when a temperature in the precipitation gauge is lower than a predetermined threshold temperature, the control unit controls a heater provided in the precipitation gauge to raise the temperature in the precipitation gauge to be equal to or higher than the threshold temperature.

9. A control method of a precipitation observation apparatus including a bottom plate on which a precipitation gauge and a snowfall observation apparatus are provided, the control method comprising:
    determining a state of a precipitation;
    controlling at least one of the precipitation gauge and the snowfall observation apparatus to measure the precipitation based on state information of the precipitation; and calculating at least one of a rainfall amount, a snowfall amount, and a precipitation amount based on measurement information of the precipitation, wherein the determining of the state of the precipitation includes determining whether the state of precipitation is snow or rain, wherein when the state of precipitation is snow, the determining of the state of the precipitation includes determining the state of snow as any one of dry snow and wet snow, wherein the calculating of at least one of the rainfall amount, the snowfall amount, and the precipitation amount includes calculating at least one of a snow density and a water equivalent ratio based on the precipitation amount and the snowfall amount, wherein the calculating of at least one of the rainfall amount, the snowfall amount, and the precipitation amount includes calculating expected snowfall amount information based on the water equivalent ratio, wherein the calculating of at least one of the rainfall amount, the snowfall amount, and the precipitation amount includes calculating error information based on the expected snowfall amount information and the snowfall amount and applies the error information to calculate the expected snowfall amount information.

10. A computer readable recording medium recording a program which allows a computer to execute a method of controlling a precipitation observation apparatus according to claim 9.

* * * * *